(12) United States Patent
Manwill et al.

(10) Patent No.: US 10,711,833 B2
(45) Date of Patent: Jul. 14, 2020

(54) HARD BEARING ATTACHMENT AND ALIGNMENT SYSTEMS, APPARATUS, AND TECHNIQUES

(71) Applicant: Schlumberger Technology Corporation, Sugar Land, TX (US)

(72) Inventors: Daniel Manwill, Provo, UT (US); Scott S. Dahlgren, Alpine, UT (US); David R. Hall, Provo, UT (US); Jonathan D. Marshall, Springville, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 50 days.

(21) Appl. No.: 15/761,924

(22) PCT Filed: Sep. 15, 2016

(86) PCT No.: PCT/US2016/052015
§ 371 (c)(1),
(2) Date: Mar. 21, 2018

(87) PCT Pub. No.: WO2017/053173
PCT Pub. Date: Mar. 30, 2017

(65) Prior Publication Data
US 2018/0266480 A1    Sep. 20, 2018

Related U.S. Application Data

(60) Provisional application No. 62/221,668, filed on Sep. 22, 2015.

(51) Int. Cl.
*F16C 17/04* (2006.01)
*F16C 33/04* (2006.01)
*F16C 17/02* (2006.01)

(52) U.S. Cl.
CPC .............. *F16C 17/04* (2013.01); *F16C 33/04* (2013.01); *F16C 33/043* (2013.01); *F16C 17/02* (2013.01);
(Continued)

(58) Field of Classification Search
CPC ........ F16C 17/04; F16C 17/22; F16C 33/043; F16C 2352/00; F16C 17/02; F16C 2206/82
(Continued)

(56) References Cited

U.S. PATENT DOCUMENTS 3,913,990 A * 10/1975 Eklund .................... B23P 6/00
                                                       384/208
5,074,040 A * 12/1991 Nisley .................. F16C 23/084
                                                       29/898.066
(Continued)

FOREIGN PATENT DOCUMENTS

JP    H10157017 A    6/1998
WO    WO2014014671 A1    1/2014

OTHER PUBLICATIONS

International Search Report and Written Opinion issued in International Patent Application PCT/US2016/052015, dated Dec. 22, 2016. 13 pages.

(Continued)

*Primary Examiner* — Marcus Charles

(57) ABSTRACT

A mechanical bearing includes a hard bearing element and a support element affixed to the hard bearing element, with a joining element between the hard bearing element and the support element, the joining element being more flexible than the hard bearing element and the support element.

21 Claims, 30 Drawing Sheets

(52) U.S. Cl.
CPC ...... *F16C 2206/82* (2013.01); *F16C 2352/00* (2013.01)

(58) Field of Classification Search
USPC ............. 384/215, 227, 308; 29/898.07
See application file for complete search history.

(56) References Cited

U.S. PATENT DOCUMENTS

| | | | | |
|---|---|---|---|---|
| 5,215,386 | A * | 6/1993 | O'Dwyer | F16C 35/077 384/537 |
| 6,024,494 | A * | 2/2000 | Buse | F04D 29/0413 384/122 |
| 6,309,762 | B1 * | 10/2001 | Speckert | C23C 26/02 428/683 |
| 6,702,467 | B2 * | 3/2004 | Testroet | B60G 7/02 384/222 |
| 9,410,573 | B1 * | 8/2016 | Lu | F16C 33/043 |
| 9,790,992 | B1 * | 10/2017 | Lingwall | F16C 33/043 |
| 2010/0187014 | A1 | 7/2010 | Ide | |
| 2010/0215301 | A1 * | 8/2010 | Wenzel | E21B 7/068 384/452 |
| 2010/0225114 | A1 * | 9/2010 | Perner | F16C 32/0402 290/53 |
| 2012/0037425 | A1 | 2/2012 | Sexton et al. | |
| 2013/0016935 | A1 * | 1/2013 | Cooley | E21B 4/003 384/420 |
| 2013/0309522 | A1 * | 11/2013 | Ito | C04B 41/00 428/596 |
| 2015/0152914 | A1 * | 6/2015 | Gonzalez | F16C 33/043 384/284 |

OTHER PUBLICATIONS

International Preliminary Report on Patentability issued in International Patent application PCT/US2016/052015, dated Apr. 5, 2018, 10 pages.

* cited by examiner

HARD BEARING ATTACHMENT AND ALIGNMENT SYSTEMS, APPARATUS, AND TECHNIQUES

RELATED APPLICATIONS

This application claims the benefit of a related U.S. Provisional Application Ser. No. 62/221,668 filed on Sep. 22, 2015, entitled HARD BEARING ATTACHMENT AND ALIGNMENT SYSTEMS, APPARATUS, AND TECHNIQUES, the disclosure of which is incorporated by reference herein in its entirety.

BACKGROUND

Oil wells are created by drilling a hole into the earth using a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be used to cool the bit, lift rock cuttings to the surface, at least partially prevent destabilization of the rock in the wellbore, and/or at least partially overcome the pressure of fluids inside the rock so that the fluids do not enter the wellbore.

SUMMARY

Aspects of the disclosure can relate to a mechanical bearing including a hard bearing element and a support element affixed to the hard bearing element. The mechanical bearing can also include a joining element between the hard bearing element and the support element, where the joining element is more flexible than the hard bearing element and the support element. The joining element may be fused between the hard bearing element and the support element.

Aspects of the disclosure can also relate to a method of forming a mechanical bearing having a mounting surface and a running surface. A joining element can be fixed between a hard bearing element having a first surface (e.g., a first precision surface) and a support element, where the joining element is more flexible than the hard bearing element and the support element. A surface of the support element can be machined to provide a surface (e.g., a second precision surface) on the support element aligned with the first surface on the hard bearing element (e.g., the first precision surface). In other embodiments, the support element can be fabricated with a second surface (e.g., a second precision surface), and the hard bearing element and the support element can be positioned to align the first surface (e.g., the first precision surface) on the hard bearing element with the second surface (e.g., the second precision surface) (e.g., using an alignment fixture prior to fusing the joining element between the hard bearing element and the support element).

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of hard bearing attachment and alignment systems, apparatus, and techniques are described with reference to the following figures.

DETAILED DESCRIPTION

Figure 1:
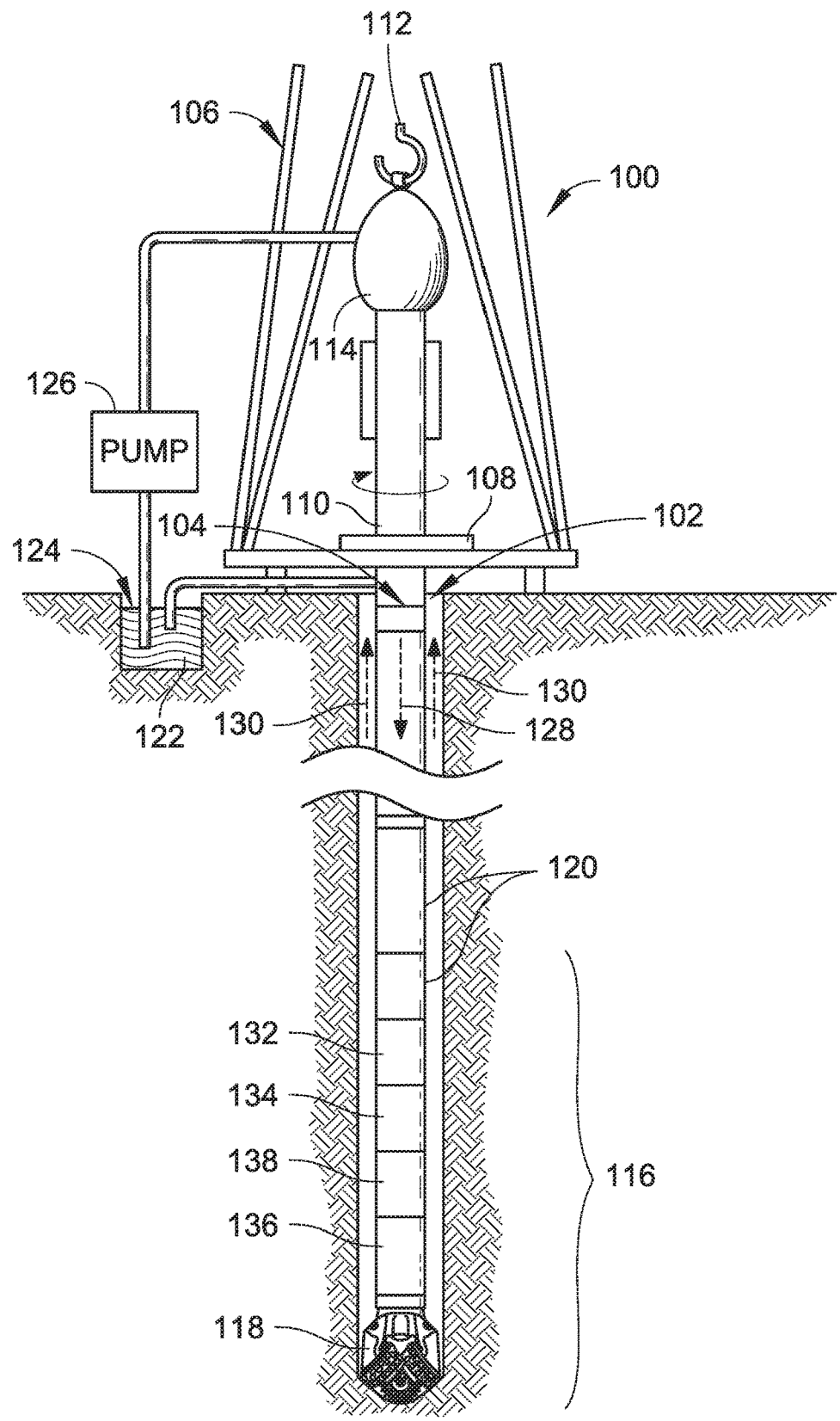
FIG. 1 illustrates an example system in which embodiments of hard bearing attachment and alignment systems, apparatus, and techniques can be implemented.

Journal and thrust bearings can be made from polycrystalline diamond (PCD) and used in environments where metal or polymer bearings may fail, e.g., due to the presence of abrasive particles and/or corrosive fluids. However, bearings made with PCD can experience thermal expansion mismatch. For example, the thermal expansion coefficient of PCD can be less than those of engineering alloys. Thus, when a PCD component and a close-fitting alloy component are assembled and then subjected to a temperature change, the fit of the components may change. Depending on the arrangement of the components, the temperature change may result in loosening or binding of the assembly, straining of the components, and so forth. Also, due to imbalances, manufacturing imperfections, and/or dynamic loads, the direction of loading on a rotating or translating bearing may not be constant. Thus, when a load of changing direction acts on a pair of components with a clearance between them, the effect can be that one of the components moves to close the clearance, which may allow the load to be transferred to the supporting structure. Then, as the direction of loading changes, there can be a continual changing of the contact point between the components.

When PCD and alloy components are assembled with a small clearance between them, relative motion can occur between the components (e.g., in response to the changing direction of loading). Because PCD can be much harder than an engineering alloy, the relative motions may result in the polishing of the alloy component by the PCD component. Over the course of many cycles of motion, the accumulated polishing action can result in wear to the alloy component and/or possible loss of integrity in the attachment of the PCD bearing. Further, compared to metal and polymer bearing materials, PCD can be very stiff and not very ductile, having little inherent ability to adapt to misalignment. Thus, a misaligned PCD bearing can wear out more quickly and may be more likely to bind. In some instances, a PCD bearing can be rigidly attached to an intermediate metal piece, moving the relative motion to metal-to-metal contact. However, abrasive particles in the environment may still infiltrate into the metal-to-metal contact gap, causing wear that may be similar to metal-to-PCD contact wear.

As described herein, systems, apparatus, and techniques are described for attaching PCD bearings to shafts and/or housings using fused, melted, or cured material, such as polyether ether ketone (PEEK), heat-accelerated metal-filled epoxies, and/or one or more other polymers and/or epoxy materials. Referring generally to FIGS. 17 through 22, systems, apparatus, and techniques are described for bonding to a shell/liner for press fit installation. In some embodiments, a PCD bearing can be fixed or bonded to a metal sleeve (e.g., for an outer journal bearing) or a liner (e.g., for an inner journal bearing) by fusing (e.g., melting) PEEK or heat-accelerated metal-filled epoxies between them to create a bearing assembly. For an inner journal bearing, the bearing assembly can be installed onto the target shaft by press fitting the metal liner onto a diameter (e.g., a precision diameter) of the shaft. For an outer journal bearing, the bearing assembly can be installed into the target housing by press fitting the metal sleeve into a bore (e.g., a precision bore) of the housing. However, a press fit installation is provided by way of example and is not meant to limit the present disclosure. In other embodiments, a bearing assembly can be installed using, for instance, a tight slip fit (e.g., using a jam nut).

In these examples, thermal expansion mismatch between the PCD and metal can be mediated by the comparatively flexible PEEK or heat-accelerated metal-filled epoxy layer between them such that strain and dimensional changes in the PCD may be reduced. Thermal expansion mismatch between the bearing assembly and the target shaft or housing can also be reduced or eliminated by fabricating the sleeve or liner portion of the bearing assembly from the same alloy as the target shaft or housing such that they expand and contract in unison. Further, relative motion and associated wear may be reduced or eliminated because the attachment method can leave negligible (e.g., no) clearance between components. As the PEEK or heat-accelerated metal-filled epoxy melts and flows between the PCD bearing and the metal sleeve or liner, it can fill the available space and bond the components. The press fit installation of the bearing assembly into the target application can create interference rather than clearance and thus prevent relative motion between the components.

In some embodiments, alignment between the bearing and shaft and/or housing can be facilitated by the application of post-processing, e.g., after bonding the metal sleeve or liner to the PCD bearing element. The sleeve or liner can be initially fabricated with excess material on the outer or inner diameter respectively. After PEEK or heat-accelerated metal-filled epoxy bonding, the bearing assembly can be returned to the machine shop. Then, the running surface of the bearing can be used as a dial-in location, and the sleeve or liner can then be machined to the final diameter needed for press-fit installation. This can provide the mounting and running surfaces of the bearing with nearly perfect alignment (e.g., according to the quality of equipment and/or gauges, the skill of the operator, and so on).

Figure 17:
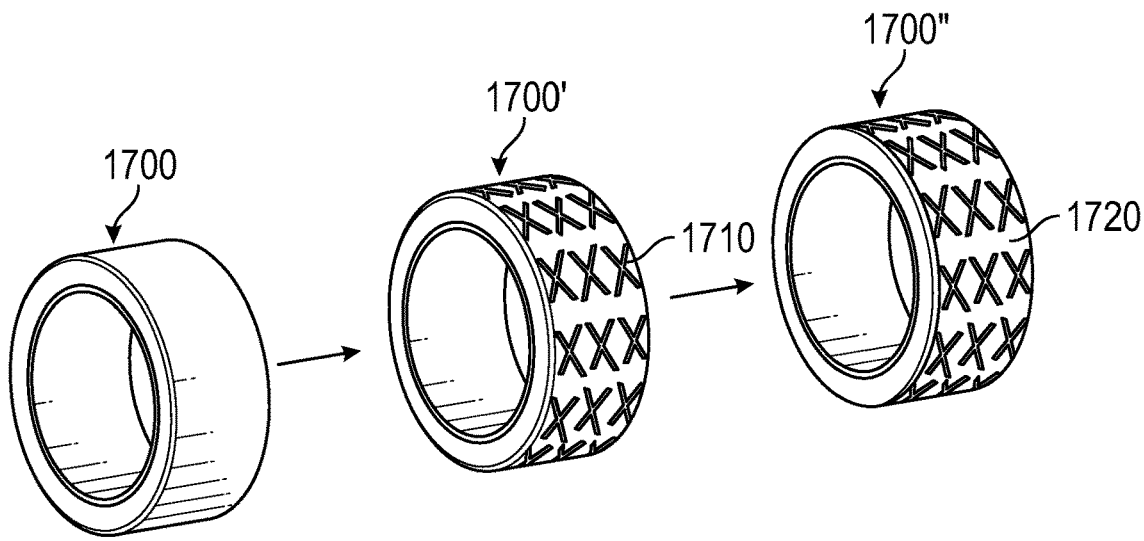
FIGS. 17-47 illustrate examples of hard bearing attachment and alignment systems, apparatus, and techniques in accordance with one or more embodiments.
Figure 18:
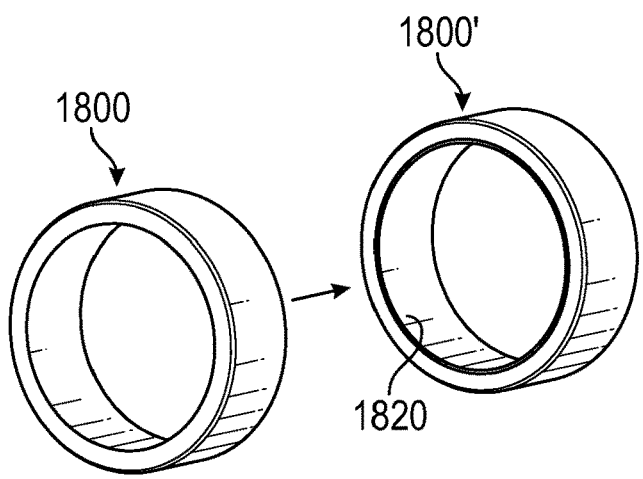
Figure 19:
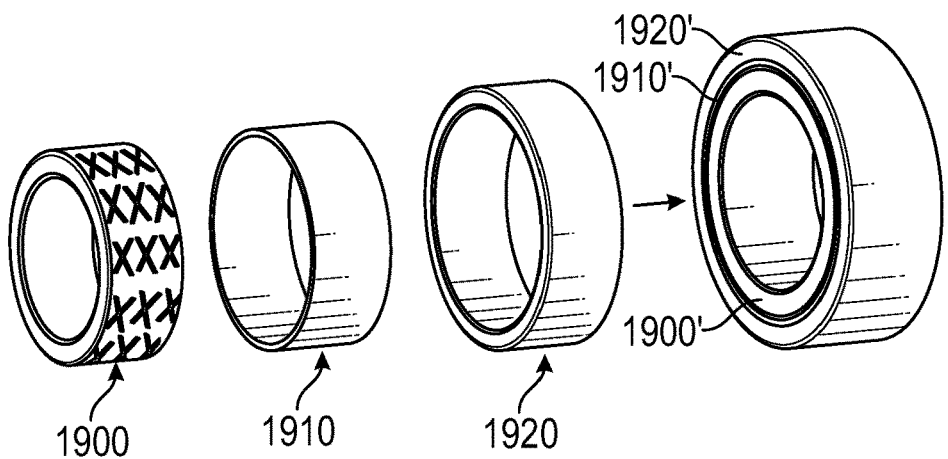
Figure 20:
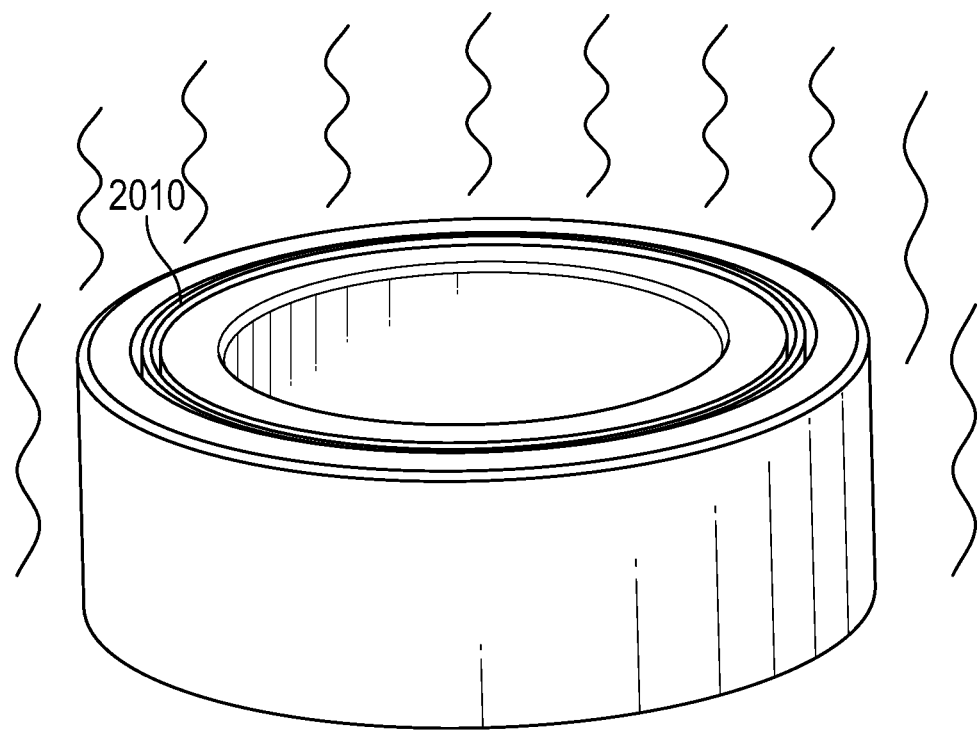
Figure 21:
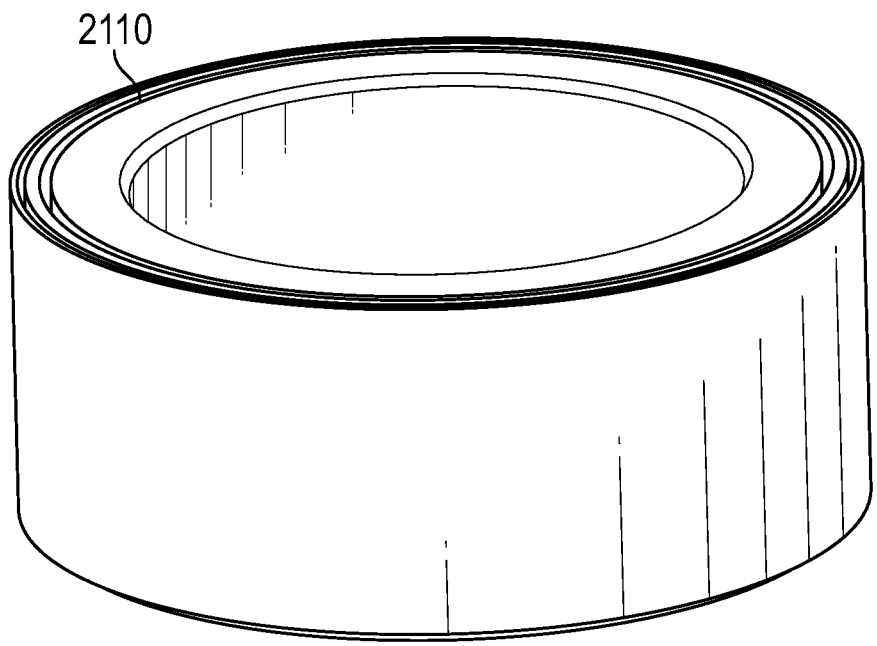

With reference to FIG. 17, a PCD bearing 1700 can be prepared to net shape, textured 1710 (to become textured PCD bearing 1700'), and the to-be-bonded surface can be metalized 1720 (to become metalized PCD bearing 1700"). It should be noted that while the accompanying figures illustrate an outer journal bearing, the systems and techniques described herein may be applicable to an inner journal bearing (e.g., by inverting inner and outer components and surfaces) as well as to other components. With reference to FIG. 18, a metal element 1800 can be prepared with a slight excess of material on the non-bonded surface and the to-be-bonded surface can be metalized 1820 (to become metalized metal element 1800'). With reference to FIG. 19, the PCD bearing 1900 can be assembled with the metal element 1920 and epoxy source 1910 (e.g., a preformed ring as shown including assembled PCD bearing 1900', assembled epoxy source 1910', and assembled metal element 1920'). With reference to FIG. 20, the epoxy 2010 can be melted (e.g., in an oven, where the parts are oriented so that gravity does not cause a substantial loss of concentricity).

It should be noted that although perfect alignment of the PCD and metal components may not necessarily be achieved at this stage of fabrication, the strength of the press fit and thermal stability of the assembly may be improved when alignment is good. If a source of inconsistency is present (such as the PEEK or heat-accelerated metal-filled epoxy source material having an inconsistent thickness or distribution), a fixture may be used to bring the PCD and metal components into better alignment. Next, with reference to FIG. 21, the epoxy 2110 is cooled to solidify, and then post-processing can be used to set final dimensions, achieve alignment of running and mounting surfaces, and so forth.

Figure 22:
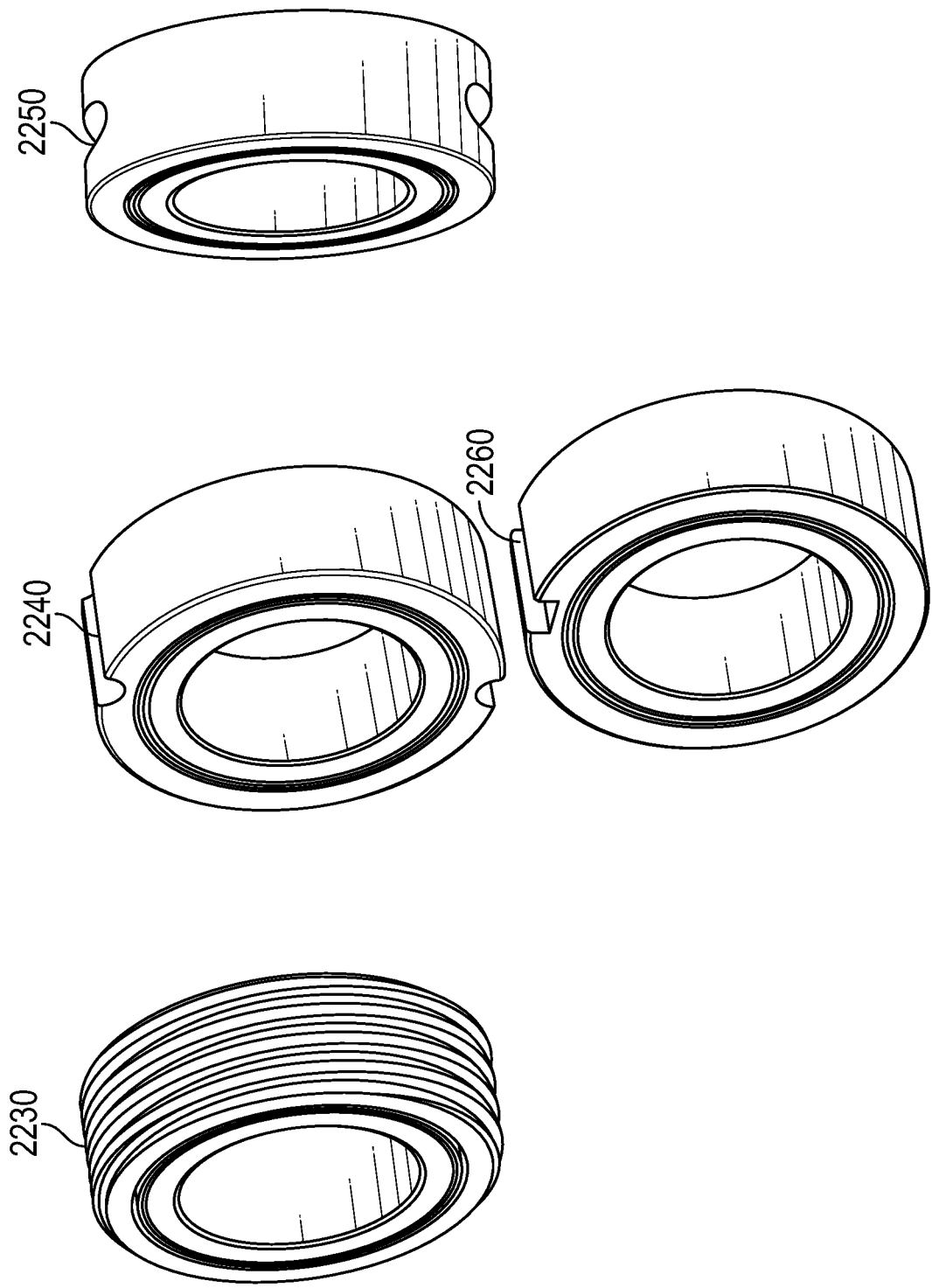

With reference to FIG. 22, bonding to a shell/liner can be finished with mechanical assembly features. In some embodiments, rather than being installed by press fit, the metal element in the assembly can be finished and/or installed with a mechanical assembly feature, such as a thread 2230, a keyway 2240, a dowel pin hole 2250 and/or groove 2260, a snap-ring groove, a quarter-turn feature, a bayonet lock, etc. Alignment between running and mounting surfaces of the bearing can be achieved by dial in during finishing. FIG. 22 shows multiple implementations for an outer journal bearing. However, as previously noted, similar implementations may also be used for an inner journal bearing, and so forth.

It should be noted that although thermal expansion mismatch and PCD-to-metal relative motion may be reduced or eliminated using this technique, the installation to the target assembly may introduce the possibility of metal-to-metal relative motion. To prevent loss of attachment integrity, additional measures may be taken to constrain motion. For example, in the case of a threaded installation, threads may be treated with a threadlocker and/or tightened so as to not loosen and allow motion. In the case of key type features, a tapered key and/or keyway may have a zero-clearance contact region and thus reduce or eliminate relative motion.

Figure 37:
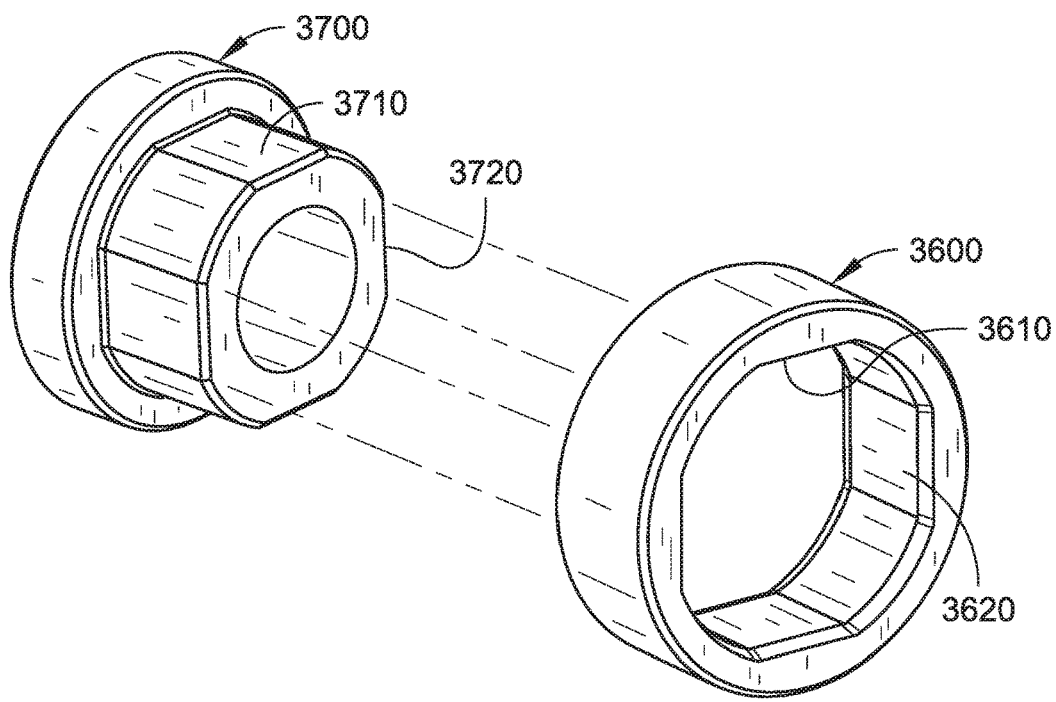
Figure 38:
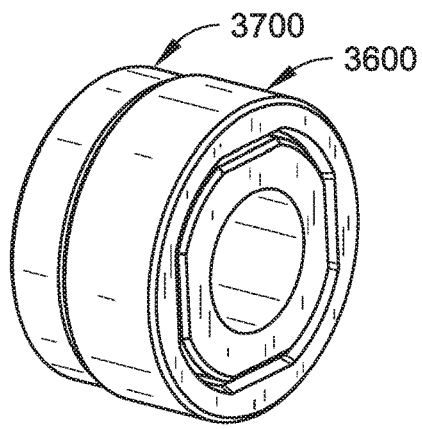
Figure 39:
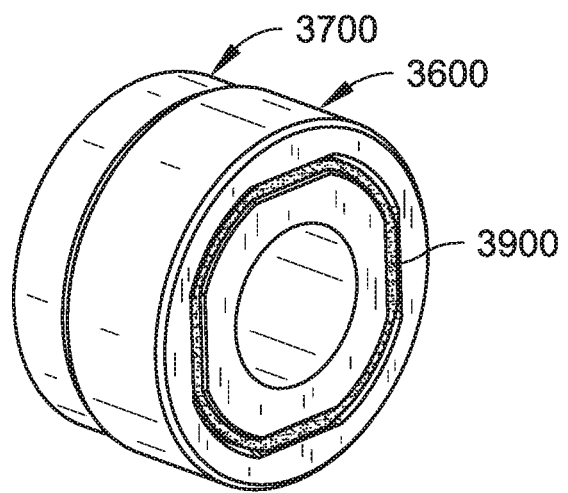
Figure 40:
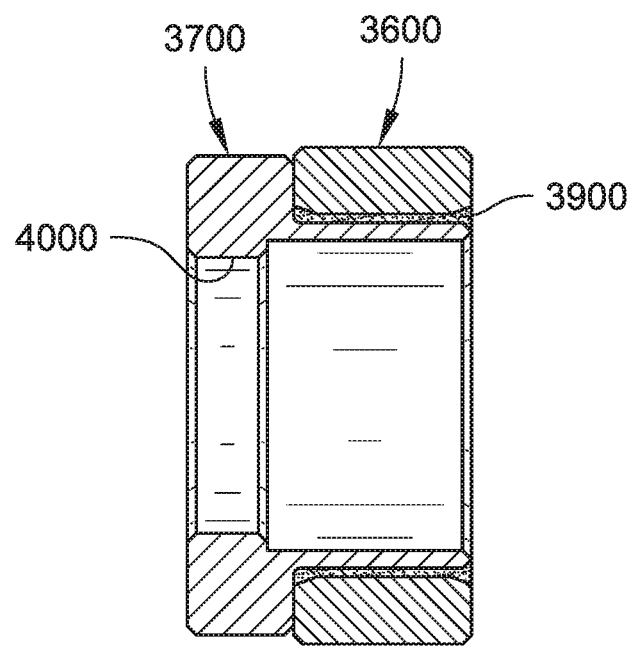

Referring now to FIGS. 36 through 47, in some embodiments, the bearing and/or the sleeve of a bearing assembly can include one or more mechanical features, e.g., so that the load on the bearing is not carried only by the shear adhesion of the PEEK or epoxy. For example, with reference to FIG. 36, a PCD bearing 3600 can be prepared (e.g., cut) with one or more flats (e.g., a first flat 3610, a second flat 3620, and so on), and the to-be-bonded surface can be metalized (and possibly textured). With reference to FIG. 37, a metal element (e.g., a liner/sleeve blank 3700) can be prepared (e.g., cut) with one or more flats (e.g., a third flat 3710 corresponding to the first flat 3610, a fourth flat 3720 corresponding to the first flat 3620, and so on), and the to-be-bonded surface can be metalized (and possibly textured). With reference to FIG. 38, the PCD bearing 3600 can be assembled with the liner/sleeve blank 3700. With reference to FIG. 39, the bearing 3600 and the liner/sleeve blank 3700 can be bonded (e.g., with an epoxy source 3900). Then, the epoxy 3900 can be melted (e.g., in an oven, where the parts are oriented so that gravity does not cause a substantial loss of concentricity). Next, the epoxy 3900 is cooled to solidify, and then post-processing can be used to set final dimensions, achieve alignment of running and mounting surfaces, and so forth. In some embodiments, a shoulder 4000 can be included on the liner/sleeve blank 3700. The shoulder 4000 may then be machined for a press fit, while the area of the liner/sleeve blank 3700 proximate to the PCD bearing 3600 may be used for a tight slip fit. It should also be noted that a non-shouldered liner/sleeve can also have a slip fit along its entire length. For example, the assembly may be held in place (e.g., by a jam nut across the liner/sleeve preventing relative motion of the components).

Figure 41:
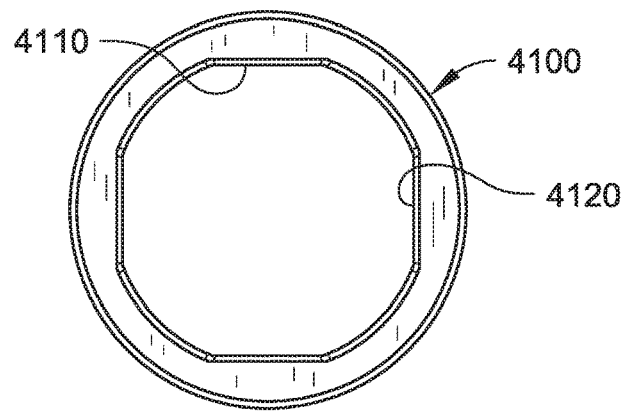
Figure 42:
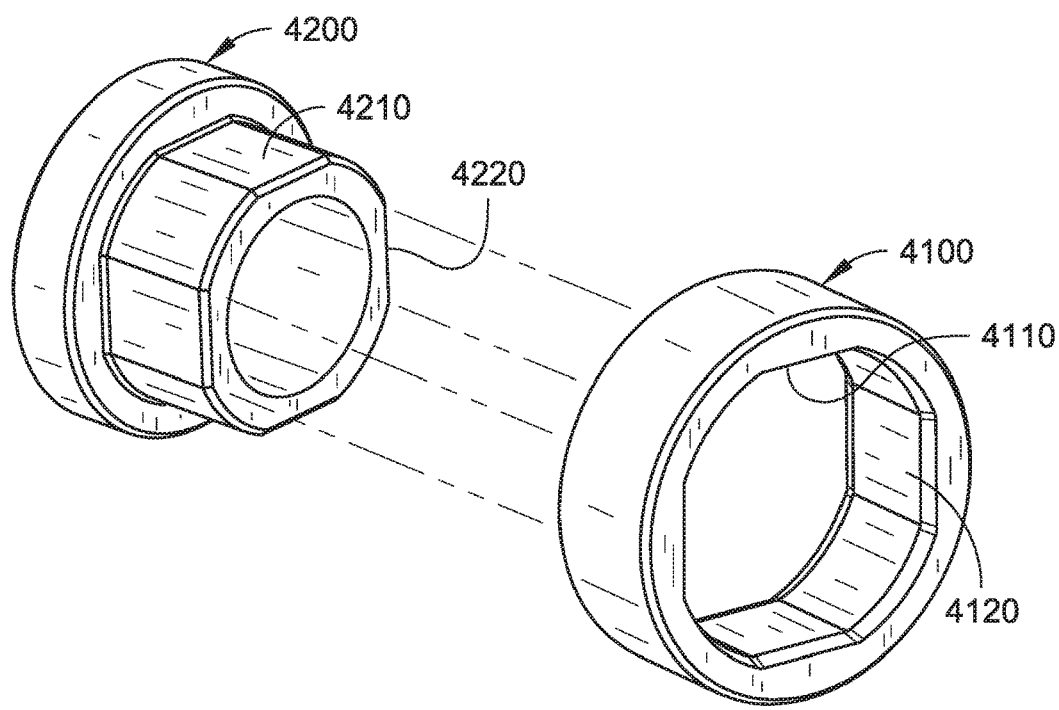
Figure 43:
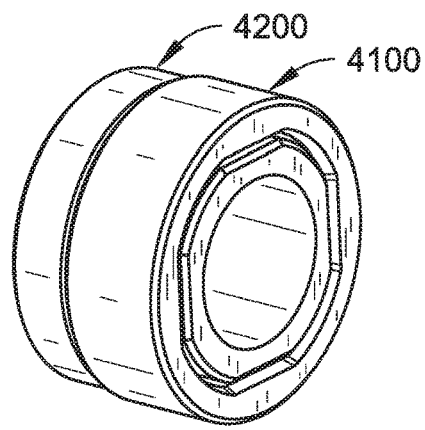
Figure 44:
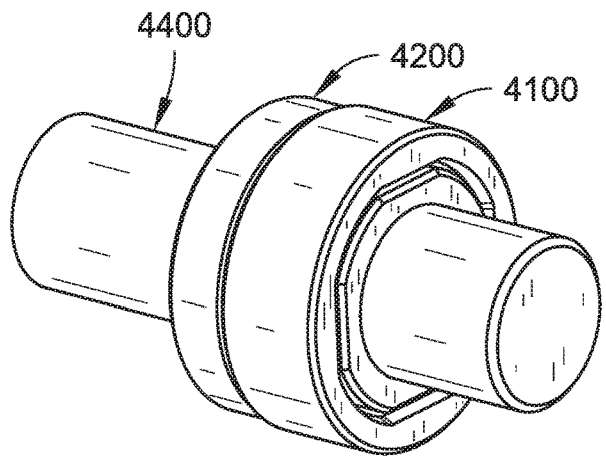
Figure 45:
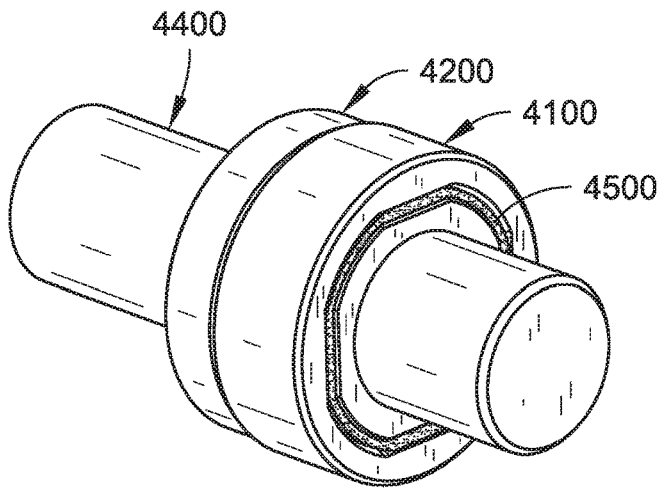
Figure 46:
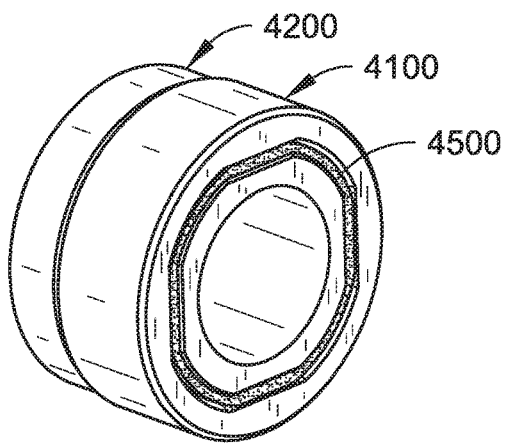
Figure 47:
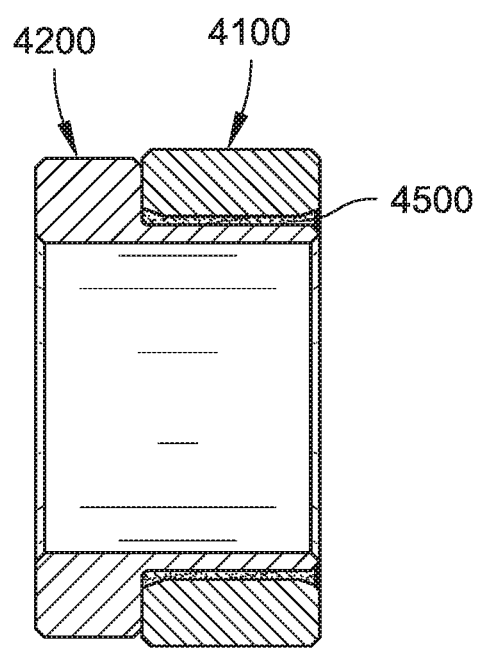

With reference to FIG. 41, a PCD bearing 4100 can be prepared (e.g., cut) with one or more flats (e.g., a first flat 4110, a second flat 4120, and so on), and the to-be-bonded surface can be metalized (and possibly textured). With reference to FIG. 42, a metal element (e.g., a liner/sleeve blank 4200) can be prepared (e.g., cut) with one or more flats (e.g., a third flat 4210 corresponding to the first flat 4110, a fourth flat 4220 corresponding to the first flat 4120, and so on), and the to-be-bonded surface can be metalized (and possibly textured). With reference to FIG. 43, the PCD bearing 4100 can be assembled with the liner/sleeve blank 4200. With reference to FIG. 44, in some embodiments, the liner/sleeve blank 4200 can be press fit over a dummy piece (e.g., a dummy spindle 4400) when the bonding is performed at temperature. This can allow the PEEK or epoxy layer to set in a condition that may compensate for temperature and/or a press fit. With reference to FIG. 45, the bearing 4100 and the liner/sleeve blank 4200 can be bonded (e.g., with an epoxy source 4500). Then, the epoxy 4500 can be melted (e.g., in an oven, where the parts are oriented so that gravity does not cause a substantial loss of concentricity). With reference to FIG. 46, the dummy spindle 4400 can be removed. The epoxy 4500 is cooled to solidify, and then post-processing can be used to set final dimensions, achieve alignment of running and mounting surfaces, and so forth. In some embodiments, a press fit may then be used along the length of the liner/sleeve.

Referring generally to FIGS. 23 through 27, systems, apparatus, and techniques are described for direct bonding with a taper. In some embodiments, a PCD bearing can be bonded directly to a shaft or housing rather than bonding it to an intermediate metal shell or liner. The mating surfaces of the PCD bearing and the shaft or housing can be made with shallow, matching tapers. A portion of one or both tapered surfaces may be given holding features, such as grooves, notches, undercuts, and so forth, which can provide a volume that can be filled with fused PEEK or cured heat-accelerated metal-filled epoxies to bond the parts together. In this manner, thermal expansion differences between the PCD and shaft and/or housing can be buffered by the comparatively flexible PEEK or epoxy layer between them. However, the portions of the tapered surfaces not covered by PEEK or epoxy-holding features may have the possibility of direct contact between PCD and metal, creating the potential for strain. To mitigate these strains, the assembly of the tapers can be made at an elevated temperature (e.g., somewhere between the expected average operational temperature and the fusion temperature of PEEK or the melting temperature of heat-accelerated metal-filled epoxies). After the tapers are seated, full heating of the parts to the fusion temperature can occur, and the bond can be made. When the parts cool, while there may be some strain between the PCD and metal, there may not necessarily be enough to cause failure of the bearing. In some embodiments, corresponding flats may be added to both the PCD bearing and the metal as a mechanical locking feature (e.g., as described with reference to FIGS. 36 through 47).

In this example, relative motion between the PCD and metal components may not be allowed, because they are bonded together by fused PEEK or cured heat-accelerated metal-filled epoxies, and there may be no remaining clearance between the components. In some embodiments, alignment of the PCD and metal components can be achieved by the seating of the tapers (e.g., precision tapers). The tapers can be seated with PCD and metal in direct contact. For example, if PEEK or heat-accelerated metal-filled epoxy feedstock infiltrates into the seating areas of the tapers, they may not align properly. In this example, the alignment quality of this method may be a function of the match of the tapers and the alignment of the taper with the axis of rotation in both PCD and metal components. As shown, an outer journal bearing can be installed into a housing. However, the systems and techniques described herein can also be used with an inner journal bearing installed over a shaft, a combined journal/thrust bearing, and so forth.

Figure 23:
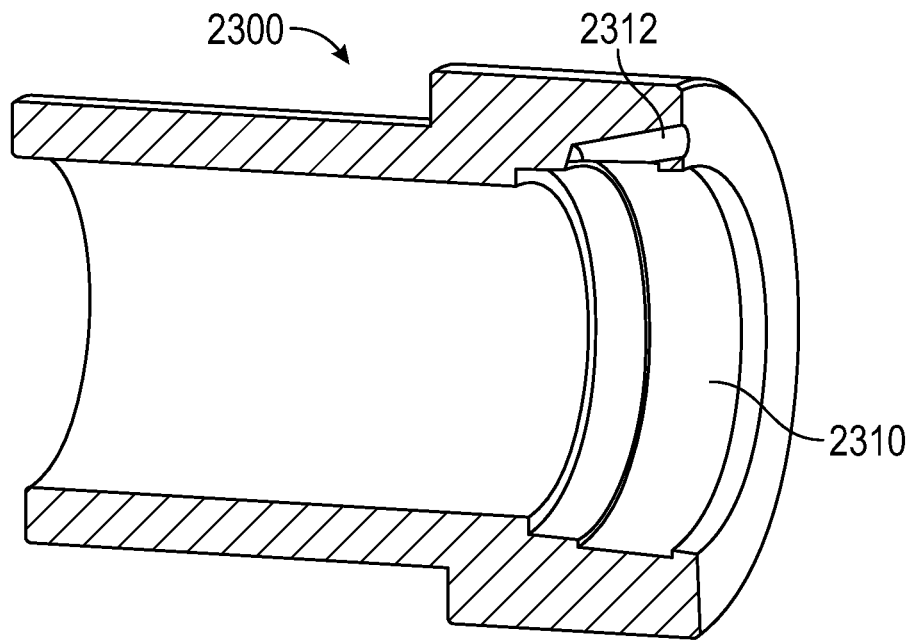
Figure 24:
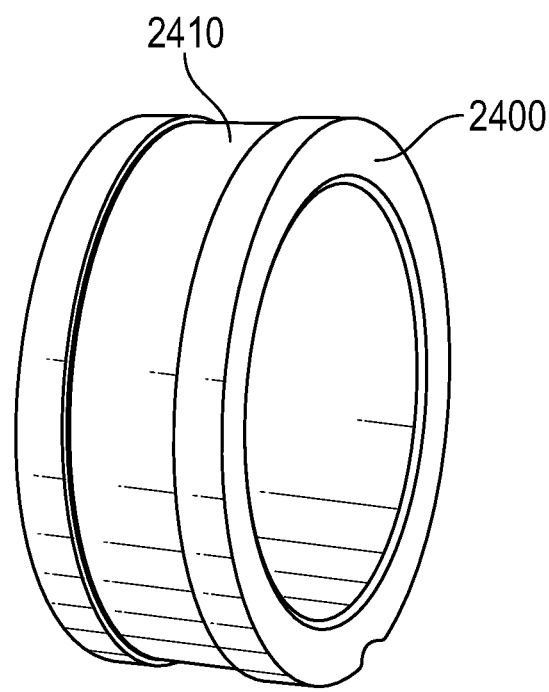

With reference to FIG. 23, a hub 2300 can be prepared with a tapered bearing seat 2310. Undercut can be added (and possibly texturized) and metalized. In some embodiments, the hub 2300 can also include one or more mechanical features, such as a first flat (e.g., as described with reference to FIGS. 36 through 47). A small passageway 2312 can be machined for introducing PEEK or heat-accelerated metal-filled epoxy feedstock. A small vent or notch can be added (e.g., diametrically opposite) to allow trapped air to escape and also give an indication of when fill is complete. With reference to FIG. 24, a PCD bearing 2400 can be prepared with a matching taper. A groove 2410 can be added (and possibly texturized) and metalized. If the undercut in the housing is sufficiently deep, the groove in the bearing may be omitted, but the bearing may still be metalized. In some embodiments, the inner diameter (ID) of an outer journal bearing can be slightly oversized so that when the housing contracts upon cooling of the PEEK or heat-accelerated metal-filled epoxy, the ID still has an appropriate clearance compared to the outer diameter (OD) of the inner journal bearing. Further, the PCD bearing 2400 may also include one or more mechanical features (e.g., a second flat) that correspond to one or more associated mechanical features on the hub 2300 (e.g., the first flat).

Figure 25:
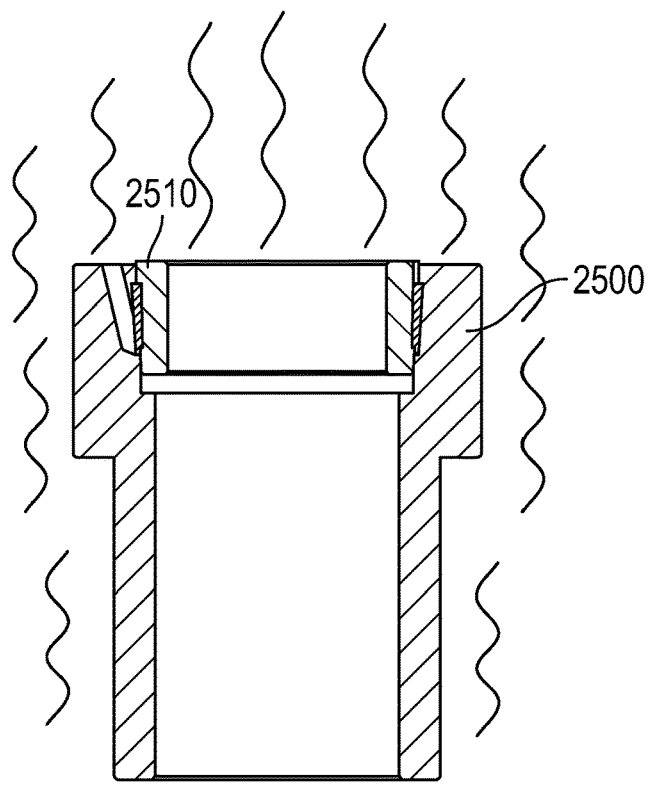
Figure 26:
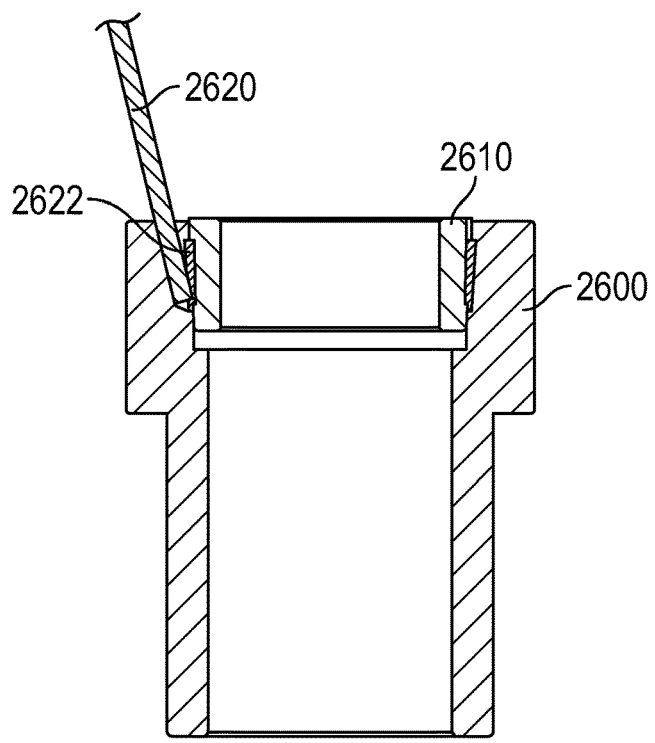
Figure 27:
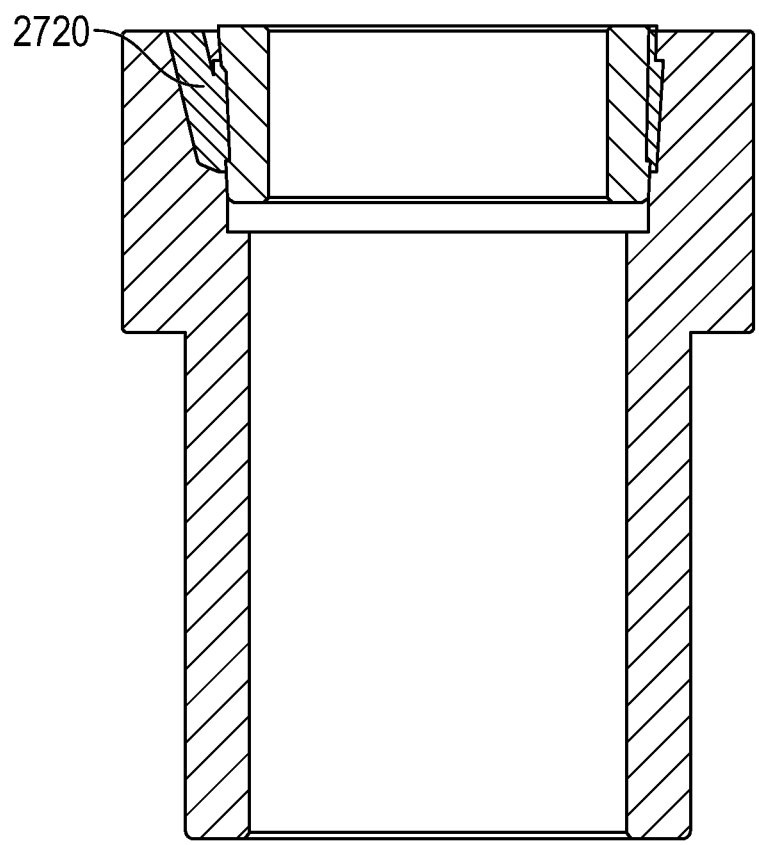

While still disassembled, one or both parts can be preheated to reduce or eliminate stress due to thermal expansion mismatch that could otherwise occur if they were assembled at room temperature, e.g., if the outer part has a lower coefficient of thermal expansion than the inner part, such as when a PCD bearing is fitted over a shaft. With reference to FIG. 25, preheated parts 2500 and 2510 can be assembled and then fully heated to the melting temperature range. With reference to FIG. 26, epoxy feedstock 2620 can be introduced through the passageway 2622 (e.g., between the preheated parts 2600 and 2610). With reference to FIG. 27, the heat of the parts can melt the epoxy 2720, which flows through the undercut and groove until it is filled. Heating can be maintained until the epoxy is fully and uniformly melted. Finally, the parts can be cooled to solidify the epoxy and finalize bond.

Referring generally to FIGS. 28 through 32, systems, apparatus, and techniques are described for direct bonding and finishing. In some embodiments, an unfinished and slightly oversized PCD bearing can be bonded to an unfinished and slightly oversized metal blank using PEEK fusion. After bonding, the PCD bearing can be finished, after which the metal blank can be finished. Thermal expansion mismatch between PCD and metal can be mediated by the comparatively flexible PEEK layer between them such that strain and dimensional changes in the PCD can be reduced. Further, relative motion and associated wear may be reduced or eliminated as the attachment can directly connect the PCD and metal components with a rigid PEEK layer, leaving no clearance between them.

In some embodiments, alignment problems between the bearing and the shaft and/or housing may be minimized because alignment features are not created until after the PCD and metal have become a solid, permanent assembly. The PCD bearing can be finished first, using the metal blank as a dial-in reference. The metal component may then be finished, e.g., using finished surfaces of the PCD bearing as dial-in references. This can position the mounting and running surfaces of the bearing in nearly perfect alignment (e.g., according to the quality of equipment and/or gauges, the skill of the operator, and so on). As shown, a combined inner journal and thrust bearing can be attached to a spindle. However, the systems and techniques described herein may be equally applicable to outer journal bearings, other geometries, and so forth.

Figure 28:
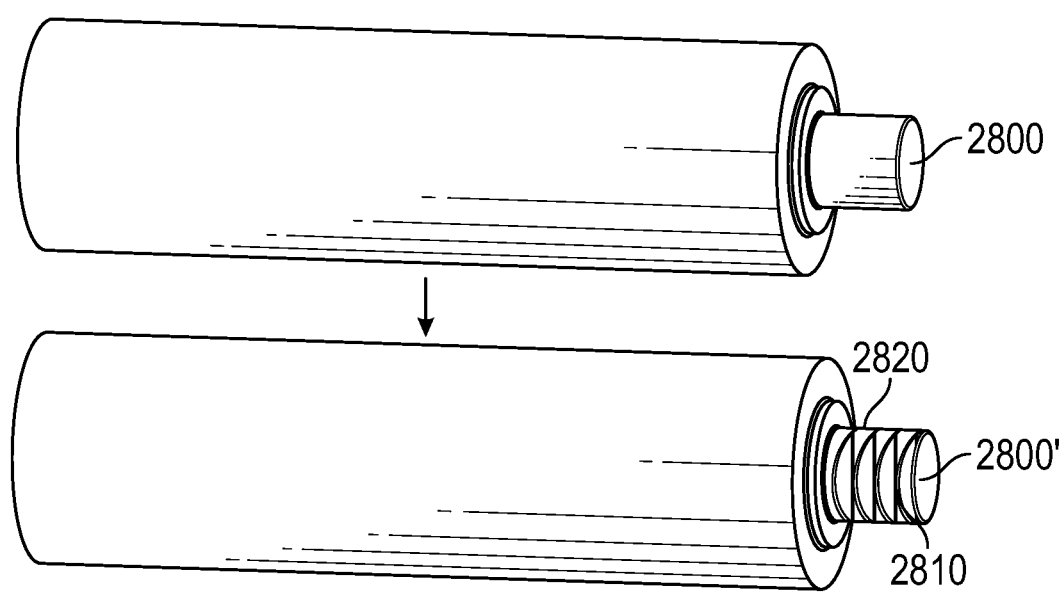
Figure 29:
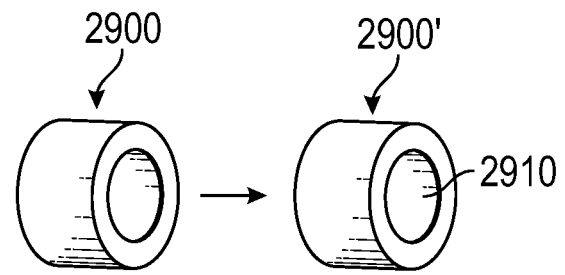
Figure 30:
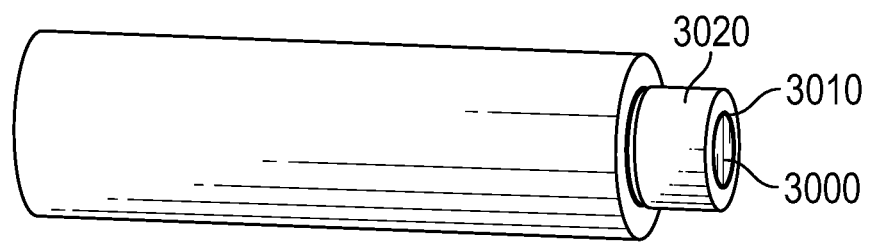
Figure 31:
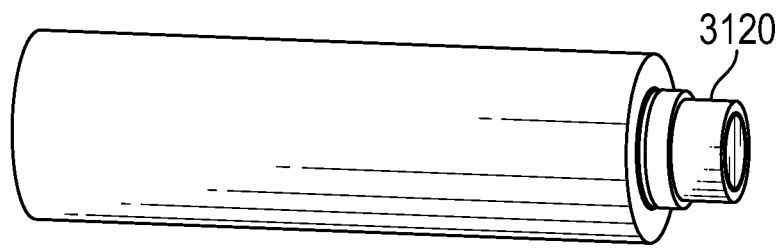
Figure 32:
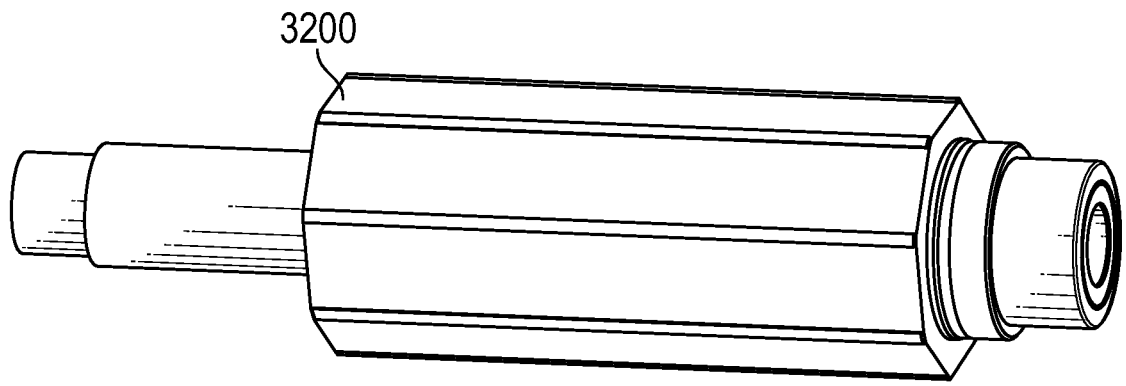

With reference to FIG. 28, an oversized metal blank 2800 can be fabricated, textured 2810, and metallized 2820 (to become textured and metallized oversize metal blank 2800'). In some embodiments, the metal blank 2800 can also include one or more mechanical features, such as a first flat (e.g., as described with reference to FIGS. 36 through 47). With reference to FIG. 29, an oversized PCD blank 2900 can be fabricated (and possibly textured) and gold plated 2910 (to become gold plated PCD blank 2900'). Further, the PCD blank 2900 may also include one or more mechanical features (e.g., a second flat) that correspond to one or more associated mechanical features on the metal blank 2800 (e.g., the first flat). Additional sublayers between the PCD blank and the gold plating may also be included, e.g., to improve bonding and reduce alloying of gold with base layers. For example, titanium (e.g., for adhesion to diamond) and nickel (to create a barrier between titanium and gold) may be sub layers between the PCD blank and the gold plating. With reference to FIG. 30, the parts (e.g., oversized metal blank 3000, and PCD bearing 3020) can be assembled with PEEK 3010 between them and fused. Then, the parts can be cooled to solidify the PEEK. With reference to FIG. 31, dialing in to the metal blank, the PCD bearing 3120 can be finished to final shape and dimensions. With reference to FIG. 32, dialing in to the finished bearing surfaces, the metal 3200 can be machined to final shape and dimensions.

Figure 33:
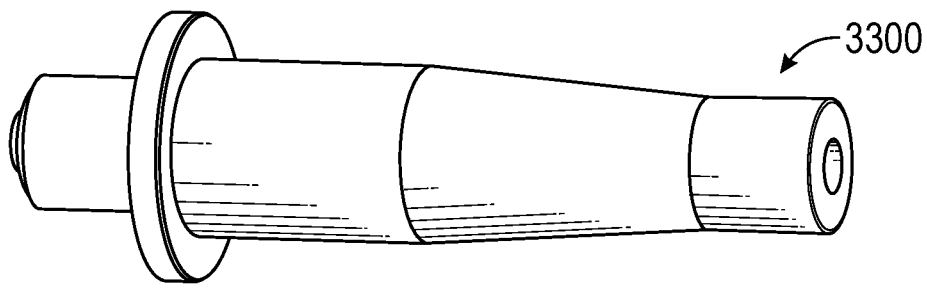
Figure 34:
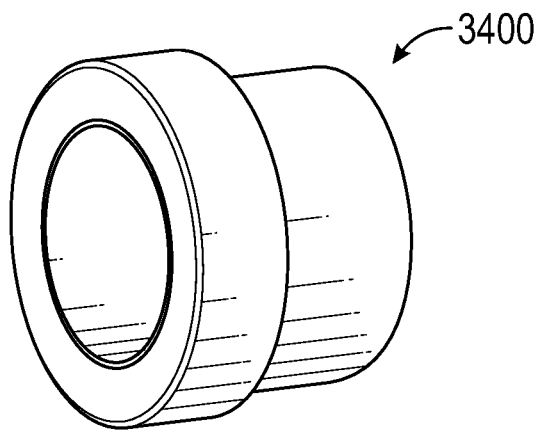
Figure 35:
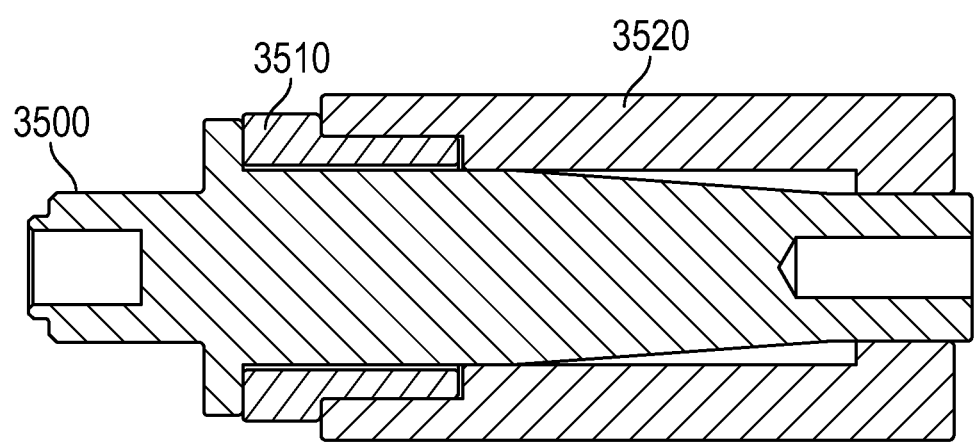
Figure 36:
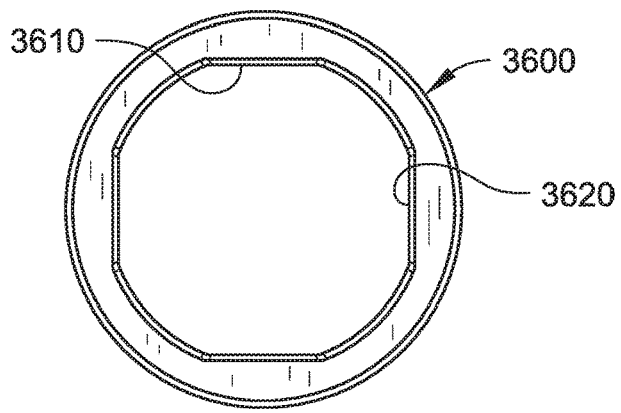

Referring generally to FIGS. 33 through 35, systems, apparatus, and techniques are described for direct bonding with a fixture. In some embodiments, a PCD bearing can be bonded to a metal component using PEEK bonding, with a fixture in place during bonding to ensure alignment. In this example, thermal expansion mismatch between the PCD and the metal can be mediated by the comparatively flexible PEEK layer between them, such that strain and dimensional changes in the PCD can be reduced. Further, relative motion and associated wear may be reduced or eliminated as the PCD and metal components are directly connected with a rigid PEEK layer, leaving no clearance between them. Additionally, alignment between the bearing and shaft and/or housing can be facilitated by keeping the PCD and the metal components in alignment during the PEEK fusion process, e.g., using a fixture. As shown, a combined inner journal and thrust bearing can be attached to a spindle. However, the systems and techniques described herein can also be applicable to outer journal bearings, other geometries, and so on.

With reference to FIG. 33, a metal component 3300 can be fabricated to final dimensions (and possibly textured and/or metalized). In some embodiments, the metal component 3300 can also include one or more mechanical features, such as a first flat (e.g., as described with reference to FIGS. 36 through 47). With reference to FIG. 34, a PCD bearing 3400 can be fabricated to final dimensions (and possibly textured and/or metalized). Further, the PCD bearing 3400 may also include one or more mechanical features (e.g., a second flat) that correspond to one or more associated mechanical features on the metal component 3300 (e.g., the first flat). With reference to FIG. 35, the components (e.g., metal component 3500 and PCD bearing 3520) can be assembled with PEEK 3510 between them, and located by an alignment fixture. The PEEK can be fused, cooled to solidify the bond, and then the fixture can be removed. In some embodiments, to allow the PEEK layer to effectively buffer the thermal expansion mismatch between the PCD and the metal, the PEEK can have a thickness between about 250 micrometers (μm) (ten one-thousandths of an inch (0.010 in.)) to about 510 μm (twenty one-thousandths of an inch (0.020)). However, this range is provided by way of example and is not meant to limit the present disclosure. In other embodiments, the PEEK can have a different thickness (e.g., less than about 250 μm (ten one-thousandths of an inch (0.010 in.)), more than about 510 μm (twenty one-thousandths of an inch (0.020)), etc.).

As described herein, to achieve bonding between the metal component, the fused PEEK, and the PCD bearing, the PCD surface and/or the metal surface can be prepared by texturing and/or metallization. For texturing, one or more of the to-be-bonded surfaces can be grooved, knurled, crosshatched, or otherwise textured such that mechanical interlock of the fused PEEK with the components can be promoted. The texture can also provide a "storage" location for excess PEEK material, which can help take up shrinkage and compensate for thermal expansion mismatch, e.g., as parts are cooled after bonding. For metallization, one or more of the to-be-bonded surfaces can be gold plated to maximize the wettability and adhesion of PEEK and/or minimize the formation of oxides at the bonded surfaces. In one example, 1.5 μm (sixty micro-inches (60 μin)) of hard gold can be placed over 2.3 μm (ninety micro-inches (90 μin)) of nickel. In some embodiments, a titanium adhesion layer can be applied to the PCD before nickel plating.

It should be noted that while the attachment methods described herein are presented for PCD bearings attached to metal shafts and housings by fused PEEK, these configurations are provided by way of example and are not meant to limit the present disclosure. Thus, the geometries and techniques shown and described herein can also be used with bearings made from other ultrahard materials, such as tungsten carbide, ceramics, and so on. In some embodiments, e.g., depending on the nature of a particular operating environment, a different bonding agent may also be used in place of fused PEEK. Some examples include, but are not necessarily limited to: bonding agents such as epoxies, metal-filled epoxies, anaerobics (e.g. threadlocker), elastomers, BAKERLOK threading compound, other fusible polymers besides PEEK, and so forth.

Diamond (or other hard materials such as carbide or ceramic) journal bearings may see negligible wear for thousands of hours of operation in the worst environments (e.g., down hole drilling applications). Diamond also has very low friction. By placing a journal bearing on an inlet of a rotating device, the bearings can keep the environment free of particles larger than the clearance between the bearings. Since this clearance can be set based upon grinding (e.g., precision grinding) and/or electrical discharge machining (EDM), the clearance can be very small, e.g., less than 12.7 μm (five ten-thousandths of an inch (0.0005 in.)) in some embodiments. However, this clearance is provided by way of example and is not meant to limit the present disclosure. In other embodiments, clearance between bearing surfaces can be less than 25.4 μm (one thousandth of an inch (0.001 in.)), greater than 25.4 μm (one thousandth of an inch (0.001 in.)), and so forth. In some embodiments, the clearance between adjacent bearing surfaces may be between about 12.7 μm (five ten-thousandths of an inch (0.0005 in.)) to about 127 μm (five thousandths of an inch (0.005 in.)) (e.g., between about 12.7 μm, 25.4 μm, 38.1 μm, 50.8 μm, 63.5 μm, 76.2 μm, 88.9 μm, 101.6 μm, 114.3 μm, 127 μm (0.0005 in., 0.001 in., 0.0015 in., 0.002 in., 0.0025 in., 0.003 in., 0.0035 in., 0.004 in., 0.0045 in., 0.005 in.) to about 12.7 μm, 25.4 μm, 38.1 μm, 50.8 μm, 63.5 μm, 76.2 μm, 88.9 μm, 101.6 μm, 114.3 μm, 127 μm (0.0005 in., 0.001 in., 0.0015 in., 0.002 in., 0.0025 in., 0.003 in., 0.0035 in., 0.004 in., 0.0045 in., 0.005 in.). Further, this small clearance can render particles that do enter the space between bearings harmless or at least comparatively harmless to mechanisms inside a device constructed using such bearings. Because this tight tolerance can be maintained and certain particles can be reduced or eliminated, surfaces within diamond journal bearings can be designed to be very close together (e.g., without the concern of wear from abrasive particles rubbing between a rotating and non-rotating surface, contacting surfaces, and so forth). Further, when a magnetic field is present, magnetic buildup may also be negated (e.g., due to small particle sizes). Thus, systems, apparatus, and techniques in accordance with the present disclosure can use hard bearings to achieve close tolerances, clean environments, and so forth.

Systems, devices, and techniques are described herein that employ a first member having a bearing surface formed from a hard material (e.g., a diamond-based material, such as a polycrystalline diamond material), and a second member coupled to an input shaft to translate (e.g., rotate, slide, etc.) with respect to the first member. In embodiments of the disclosure, the second member also has a second bearing surface formed from a hard material, which bears against the first bearing surface. In some embodiments, hard material bearings can be formed from a polycrystalline material. For example, diamond particles can be pressed together in a diamond press along with a catalyst (e.g., cobalt), and the resulting block can be shaped (e.g., ground, formed using EDM, etc.) into a bearing. However, diamond-based material is provided by way of example and is not meant to limit the present disclosure. For example, in other embodiments, tungsten carbide powder can be used (e.g., in place of or in addition to diamond-based materials).

In some embodiments, fluid for a protected environment on one side of diamond or hard bearings can be prevented from escaping due to the small clearance between the bearings. This effect can be enhanced by the use of a magnetostrictive fluid, e.g., where a magnetic field is present next to the bearing clearance. Some possible liquids that can be used with diamond or hard bearings include, but are not necessarily limited to: greases, silicons, oils, magnetostrictive fluids, drilling muds (e.g., without abrasive particles), other lubricants, hydrofluorocarbon fluids (e.g., fluorocarbon ether polymers of polyhexafluoropropylene oxide), and so on. In some embodiments, techniques in accordance with the present disclosure can be used to eliminate or reduce the need to encase a device in a housing and/or fill such a housing with oil. For example, some techniques used to protect mechanical-electrical devices in down hole drilling operations use a large oil reservoir that slowly leaks oil from a seal. The seal can wear out and fail, the oil can run out, and then the device may no longer operate. The seal can also introduce drag on a device, which can decrease the efficiency of such a device.

Systems, apparatus, and techniques of the present disclosure can be used with equipment including, but not necessarily limited to: generators, motors, solenoids, rotary swivels, gearboxes, rotary transducers, other rotary and/or linear devices, and so forth. Possible applications can include, but are not necessarily limited to: bio-medical applications (e.g., bearings for a heart pump without lubrication, such as when lubrication is not possible and/or where replacement of bearings is not desirable), applications that use abrasive chemicals, applications that use aggressive chemicals, and so on. In some embodiments, the systems, apparatus, and techniques described herein can be used with oil well equipment, such as equipment used in a wellsite system.

FIG. 1 depicts a wellsite system 100 in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down-hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid 122 can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly through the annulus region between the outside of the drill string 104 and the wall of the borehole 102, as indicated by directional arrows 130. In this manner, the drilling fluid 122 cools and lubricates the drill bit 118 and carries drill cuttings generated by the drill bit 118 up to the surface (e.g., as the drilling fluid 122 is returned to the pit 124 for recirculation). Further, destabilization of the rock in the wellbore can be at least partially prevented, the pressure of fluids inside the rock can be at least partially overcome so that the fluids do not enter the wellbore, and so forth.

In embodiments of the disclosure, the drill bit 118 comprises one or more crushing and/or cutting implements, such as conical cutters and/or bit cones having spiked teeth (e.g., in the manner of a roller-cone bit). In this configuration, as the drill string 104 is rotated, the bit cones roll along the bottom of the borehole 102 in a circular motion. As they roll, new teeth come in contact with the bottom of the borehole 102, crushing the rock immediately below and around the bit tooth. As the cone continues to roll, the tooth then lifts off the bottom of the hole and a high-velocity drilling fluid jet strikes the crushed rock chips to remove them from the bottom of the borehole 102 and up the annulus. As this occurs, another tooth makes contact with the bottom of the borehole 102 and creates new rock chips. In this manner, the process of chipping the rock and removing the small rock chips with the fluid jets is continuous. The teeth intermesh on the cones, which helps clean the cones and enables larger teeth to be used. A drill bit 118 comprising a conical cutter can be implemented as a steel milled-tooth bit, a carbide insert bit, and so forth. However, roller-cone bits are provided by way of example and are not meant to limit the present disclosure. In other embodiments, a drill bit 118 is arranged differently. For example, the body of the drill bit 118 comprises one or more polycrystalline diamond compact (PDC) cutters that shear rock with a continuous scraping motion.

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. It should also be noted that more than one LWD module and/or MWD module can be employed (e.g. as represented by another logging-while-drilling module 138). In embodiments of the disclosure, the logging-while drilling modules 132 and/or 138 include capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components for generating electrical power for the down-hole equipment. This can include a mud turbine generator (also referred to as a "mud motor") powered by the flow of the drilling fluid 122. However, this configuration is provided by way of example and is not meant to limit the present disclosure. In other embodiments, other power and/or battery systems can be employed. The measuring-while-drilling module 134 can include one or more of the following measuring devices: a weight-on-bit measuring device, a torque measuring device, a vibration measuring device, a shock measuring device, a stick slip measuring device, a direction measuring device, an inclination measuring device, and so on.

In some embodiments, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform). In other embodiments, directional drilling enables horizontal drilling through a reservoir, which enables a longer length of the wellbore to traverse the reservoir, increasing the production rate from the well. Further, directional drilling may be used in vertical drilling operations. For example, the drill bit 118 may veer off of a planned drilling trajectory because of the unpredictable nature of the formations being penetrated or the varying forces that the drill bit 118 experiences. When such deviation occurs, the wellsite system 100 may be used to guide the drill bit 118 back on course.

The drill string 104 can include one or more extendable displacement mechanisms, such as a piston mechanism that can be selectively actuated by an actuator to displace a pad toward, for instance, a borehole wall to cause the bottom hole assembly 116 to move in a desired direction of deviation. In embodiments of the disclosure, a displacement mechanism can be actuated by the drilling fluid 122 routed through the drill string 104. For example, the drilling fluid 122 is used to move a piston, which changes the orientation of the drill bit 118 (e.g., changing the drilling axis orientation with respect to a longitudinal axis of the bottom hole assembly 116). The displacement mechanism may be employed to control a directional bias and/or an axial orientation of the bottom hole assembly 116. Displacement mechanisms may be arranged, for example, to point the drill bit 118 and/or to push the drill bit 118. In some embodiments, a displacement mechanism is deployed by a drilling system using a rotary steerable system 136 that rotates with a number of displacement mechanisms. It should be noted that the rotary steerable system 136 can be used in conjunction with stabilizers, such as non-rotating stabilizers, and so on.

In some embodiments, a displacement mechanism can be positioned proximate to the drill bit 118. However, in other embodiments, a displacement mechanism can be positioned at various locations along a drill string, a bottom hole assembly, and so on. For example, in some embodiments, a displacement mechanism is positioned in a rotary steerable system 136, while in other embodiments, a displacement mechanism can be positioned at or near the end of the bottom hole assembly 116 (e.g., proximate to the drill bit 118). In some embodiments, the drill string 104 can include one or more filters that filter the drilling fluid 122 (e.g., upstream of the displacement mechanism with respect to the flow of the drilling fluid 122).

Figure 2:
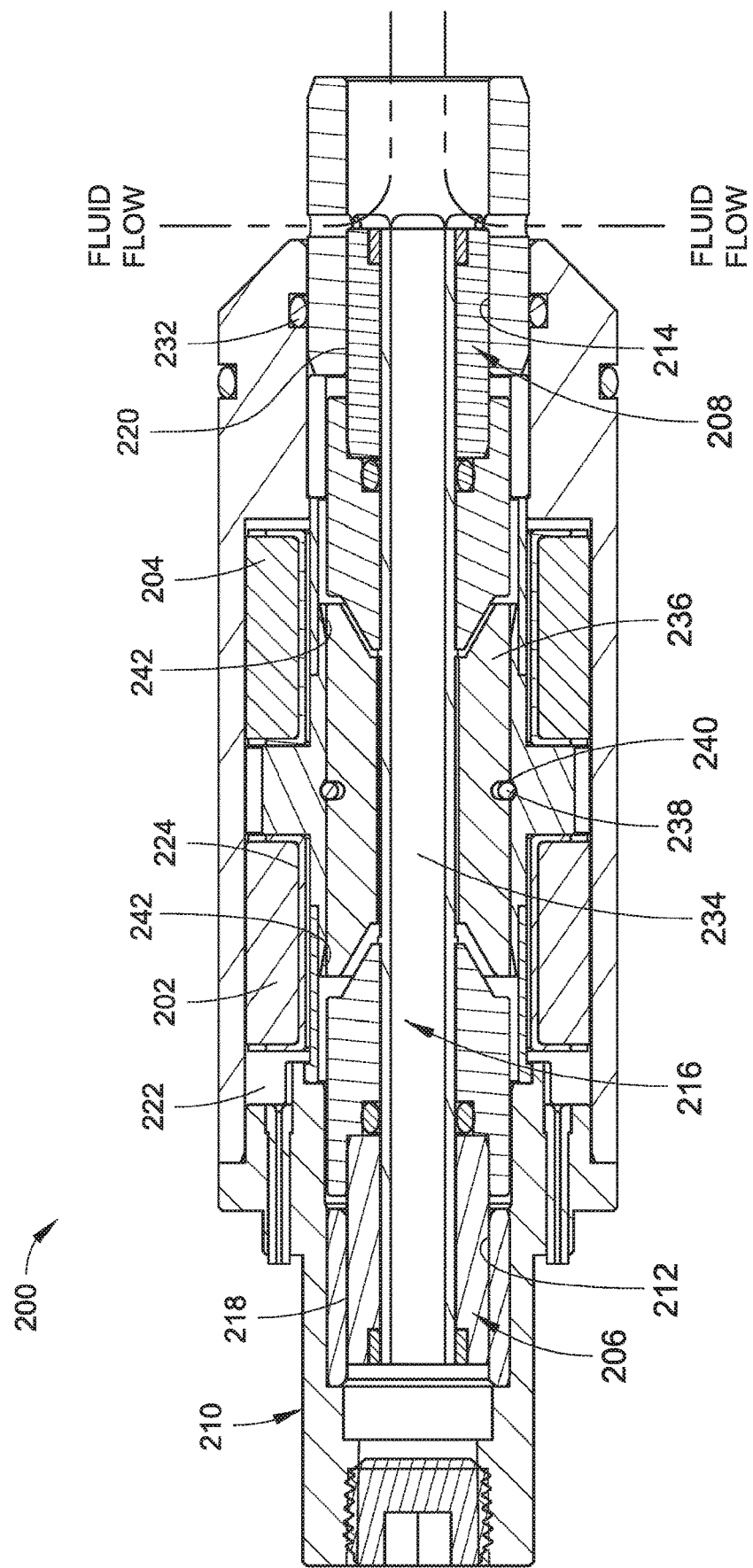
FIG. 2 illustrates an example apparatus implementing a dual solenoid to control a valve in accordance with one or more embodiments, where the valve is shown in an open configuration.
Figure 3:
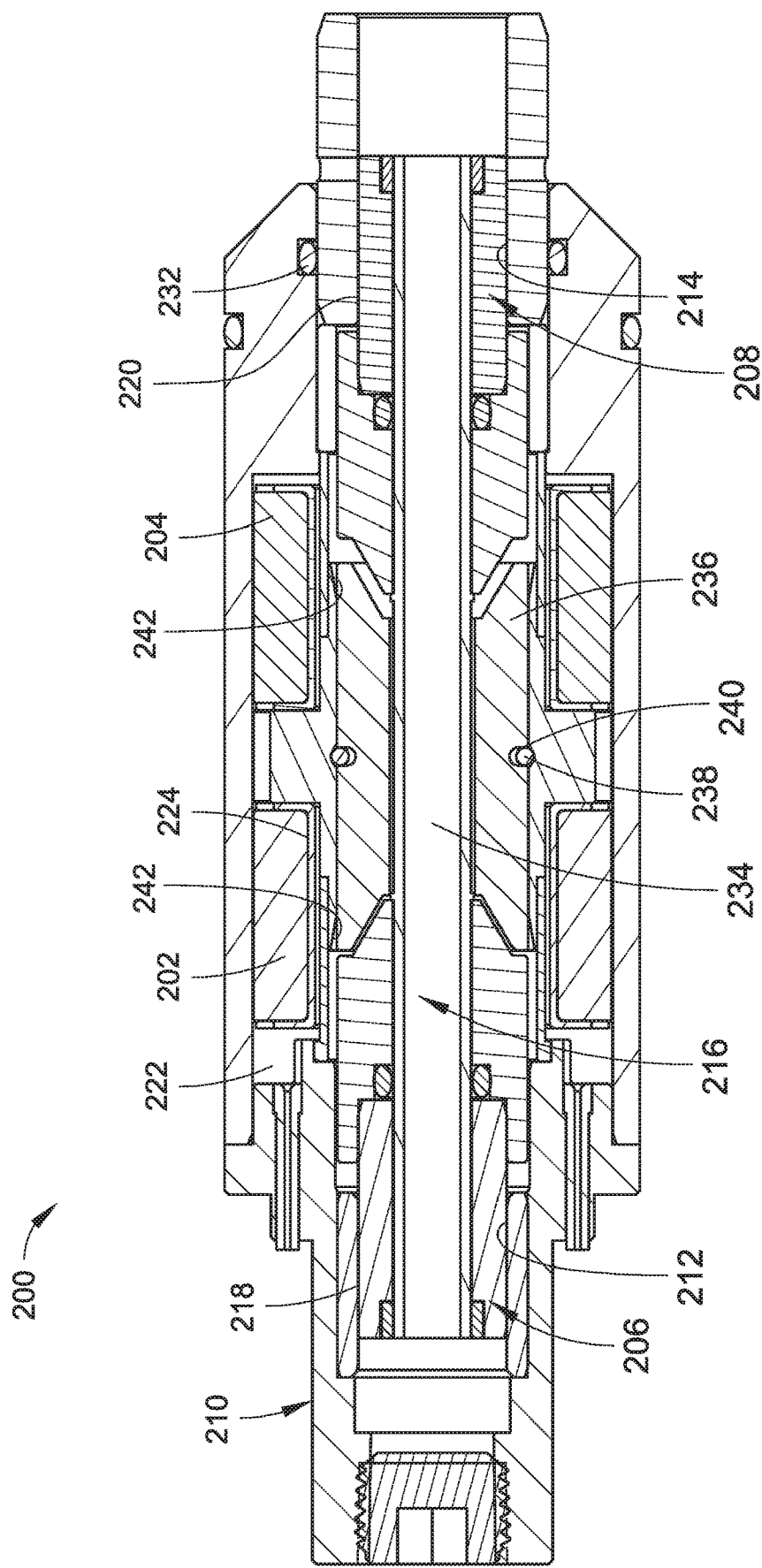
FIG. 3 is another illustration of the example apparatus of FIG. 2, where the valve is shown in a closed configuration.
Figure 4:
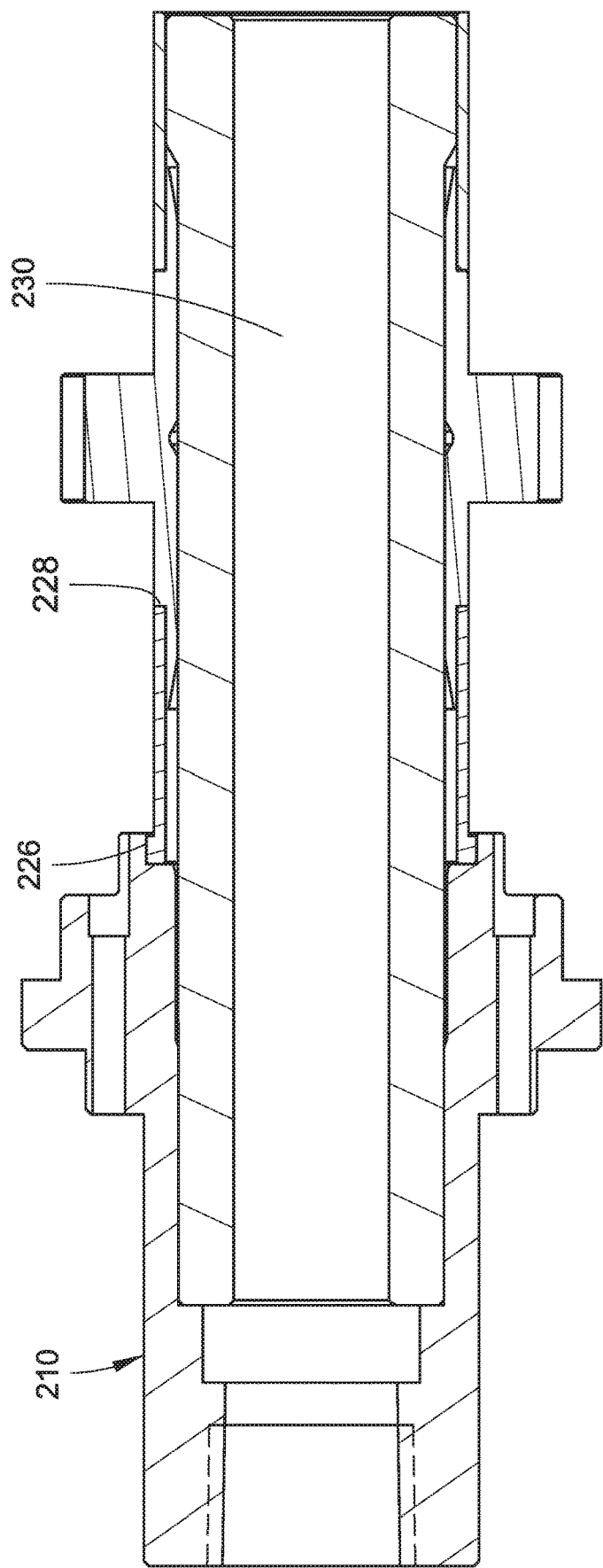
FIG. 4 is another illustration of the example apparatus of FIG. 2, where a spacer is used while connecting (e.g., welding) components to provide concentric parts.

Referring now to FIGS. 2 through 16, example systems and devices that use one or more bearings formed of diamond material and/or one or more other hard materials (e.g., carbide, ceramic, and so on) are described. With reference to FIGS. 2 through 4, a solenoid device 200 is described that uses solenoid windings 202 and 204 to open and close a valve. The solenoid device 200 also includes a bearing 206 and a bearing 208. For example, a stator 210 of the solenoid device 200 includes bearing surfaces 212 and 214 formed from a hard material (e.g., a diamond-based material, such as a polycrystalline diamond material). In some embodiments, the bearing 206 and/or the bearing 208 can be formed using a direct bonding with a fixture (e.g., as described with reference to FIGS. 33 through 35). An armature (e.g., a plunger 216) that translates with respect to the stator 210 includes bearing surfaces 218 and 220 formed from hard material, which bear against the bearing surfaces 212 and 214, respectively. The bearing 208 can be used as the inner part of the valve to port a fluid, such as drilling mud (e.g., with reference to FIG. 1). As described, because the pressure is exerted in a balanced way from outside the solenoid device 200 to inside the device, the valve can be operated to open and close with comparatively little force. Because the clearance between the moving parts and the stationary parts of the solenoid device 200 may directly affect the force generated, a tighter clearance can be maintained, and the solenoid device 200 can be more efficient. Further, the bearings 206 and 208 can limit particles from entering into the region between the plunger 216 and stator 210 based upon the tight clearances. By limiting the size of the particles, the clearance in the solenoid device 200 can be very small, and the solenoid may be more efficient (e.g., with respect to a solenoid not having such tight clearances).

In some embodiments, both bearings 206 and 208 may have the same diameter, or at least substantially the same diameter, and the fluid volume between the two bearings 206 and 208 may not change due to the opening and closing of the valve. This fixed volume can be filled with a liquid selected for solenoid operations. Because of the fixed volume, there may also be minimal or no resistance from fluid being forced into the tight gap between the bearings 206 and 208. In some implementations, moving parts of a solenoid may strike nonmoving parts. In the embodiments described herein, fluid trapped between the bearings may act as a fluid damper as a moving surface approaches a nonmoving surface (e.g., at the end of a stroke).

In some embodiments, the solenoid windings 202 and 204 can be exposed to pressures of up to about 200 megaPascal (MPa) (thirty thousand pounds-per-square inch (30,000 psi)) down hole. Thus, a casing around the solenoid windings 202 and 204 can be connected (e.g., welded) together and filled with a filler material (e.g., potting 222). For instance, a sleeve 224 of non-magnetic material can be welded between the magnetic materials at weld joints 226 and 228 (e.g., so that the magnetic effect, which moves the solenoid, is not shorted between the materials). The potting 222 can support the non-magnetic sleeve 224, which may be formed using a thin metal material, so that it does not deform, or undergoes at least substantially limited deformation, due to the high pressure experienced by the solenoid device 200. In some embodiments, potting can also be used to seal one or more wires that exit the solenoid into a pressure vessel, which may eliminate or reduce the use of a bulk head connector in some embodiments.

Generally, when a solenoid body is formed using multiple components, the concentricity of the two outer bearings may be limited. However, as described with reference to FIG. 4, a very tight spacer 230 can be used while connecting (e.g., welding at weld joints 226 and 228) the components to provide concentric parts. Further, a gasket (e.g., an O-ring 232) can be disposed around one or more of the outer bearings, which can decouple the bearing or bearings and allow them to float a small amount. In some embodiments, a small diameter flexible tube 234 can be used to attach one side of the moving element to the other. As described herein, the tube 234 can be formed using a flexible material, such as titanium, plastic, or one or more other flexible materials, which may reduce or eliminate concentricity issues.

In other embodiments, components of bearings described herein are fixedly connected to a rigid input shaft, such as a steel shaft. For example, a component having a bearing surface formed from a hard material is affixed to a steel shaft using a glue, an adhesive (e.g., a cyanoacrylate adhesive), PEEK melted and bonded to the shaft, a resin, and so forth. In some embodiments, the steel shaft can be prepared to accept a bonding material. For example, the steel shaft can be plated with another metal, such as gold.

In some embodiments, moving parts that are serviced or replaced can be installed from one end of the solenoid device 200. This configuration can facilitate easier and/or more efficient serviceability, and may also allow a pressure vessel where electronics are installed to remain undisturbed, or at least substantially undisturbed, during servicing. For example, a central non-moving part 236 of the solenoid device 200 can include an inner mechanism and an outer mechanism. The non-moving part 236 can be installed with the moving parts (e.g., tube 234, bearings 206 and/or 208, etc.) and may have a securing mechanism (e.g., a round snap ring 238) that secures the non-moving part 236 in place (e.g., once the removable parts are installed). The snap ring 238 can be configured so that more force is used to remove the snap ring 238 than the solenoid device 200 generates during operation. This configuration can be implemented using ramps. For example, a ramp 240 can be positioned proximate to a groove that receives the round snap ring 238. In some embodiments, a tool can be used to remove the removable parts, where the tool is configured to generate enough force to collapse the ring using the ramp 240 to remove the assembly. Further, one or more ramps 242 can also be included to facilitate insertion of the snap ring 238.

In some embodiments, an apparatus using diamond and/or hard material bearings can be implemented as a motor and/or a generator. Generally, the performance of motors and generators can be related to how closely the rotating magnetic field of a rotor is to a stator. For example, power may decrease exponentially with gap size (e.g., due to low permeability of ambient air, a fluid gap between the rotor and the stator, and so on). In an abrasive environment, such as down hole in a drilling operation, the gap between a rotor and a stator may be determined based upon particle sizes present between the rotating and stationary surfaces. By using, for example, diamond bearings as a filter to eliminate particles above a certain particle size from entering a very small gap, the particles that do enter the gap may be small enough that their impact on the rotor and/or stator components may be minimal. This configuration can allow rotating surface to be much closer to stationary surfaces, and thus the efficiency of a motor and/or generator can be increased.

Further, it may be desirable to use a larger separation between a rotor and a stator when windings are isolated from a conductive fluid (e.g., to prevent electrical shorting between the components). As described herein, a thin sheet of metal can be used to protect the stationary portion of the device. In this configuration, one or more inside voids can be filled with a filler material, such as potting, to support the thin sheet of metal (e.g., preventing the sheet from collapsing under pressure). In some embodiments, a thin sheet of metal can be made even thinner, e.g., when there are no large particles present to wear through it. Further, as described herein, such a sheet may not necessarily be used with example motors and/or generators of the present disclosure. This configuration can also decrease the gap between rotating and stationary components of the device. In some embodiments, example motors and/or generators described do not necessarily use a rotary seal and/or an oil reservoir. For example, in some embodiments, a motor and/or a generator using diamond or hard bearings operates in drilling mud.

Figure 5:
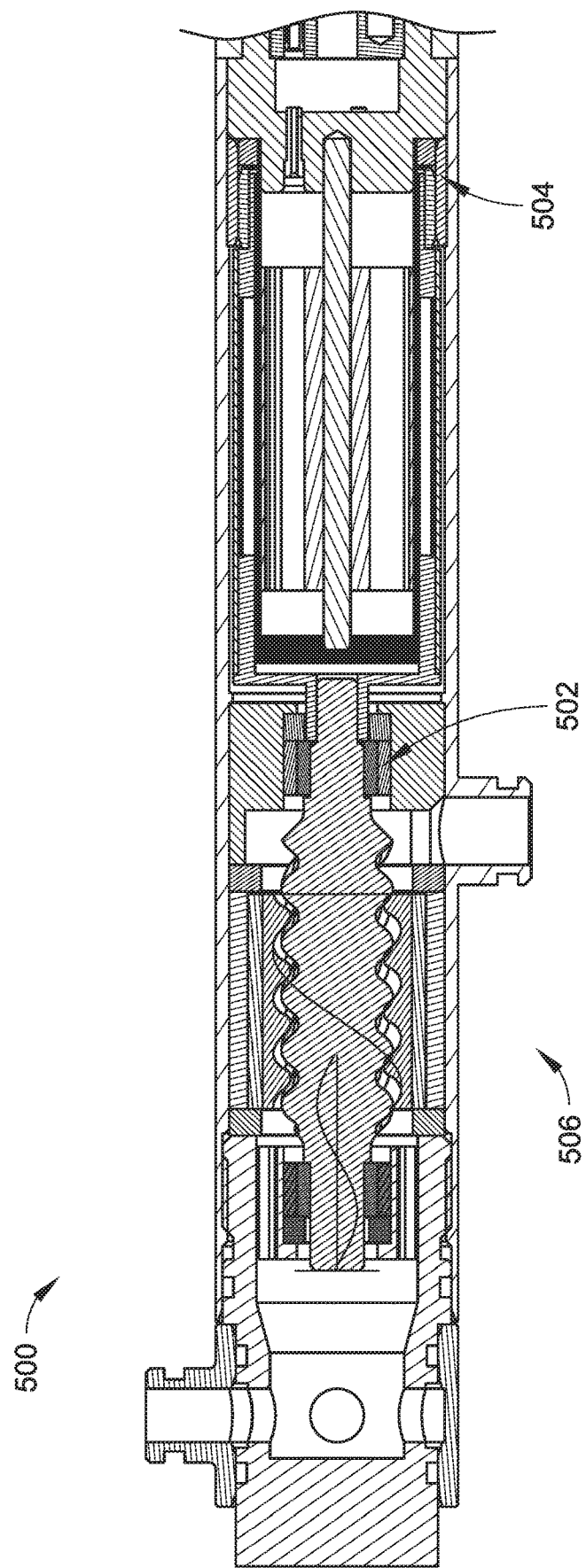
FIG. 5 illustrates an example apparatus implementing an out-runner radial flux generator in accordance with one or more embodiments.

With reference to FIG. 5, an out-runner radial flux generator 500 is described. The generator 500 can have diamond or hard journal bearings 502 and/or 504 on either or both sides of the generator 500. In some embodiments, the bearing 502 can be formed using bonding to a shell/liner for press fit installation (e.g., as described with reference to FIGS. 17 through 22). Further, the bearing 504 can be formed using direct bonding with a fixture (e.g., as described with reference to FIGS. 33 through 35). As shown in the accompanying figure, side 506 of the generator 500 can be a possible inlet for particles, and the bearings 502 and 504 can limit the size of these particles so that a thin sheet of metal can be very thin or removed altogether, allowing magnets of the generator 500 to be much closer to the laminations and increasing the power output of the generator 500.

Figure 6:
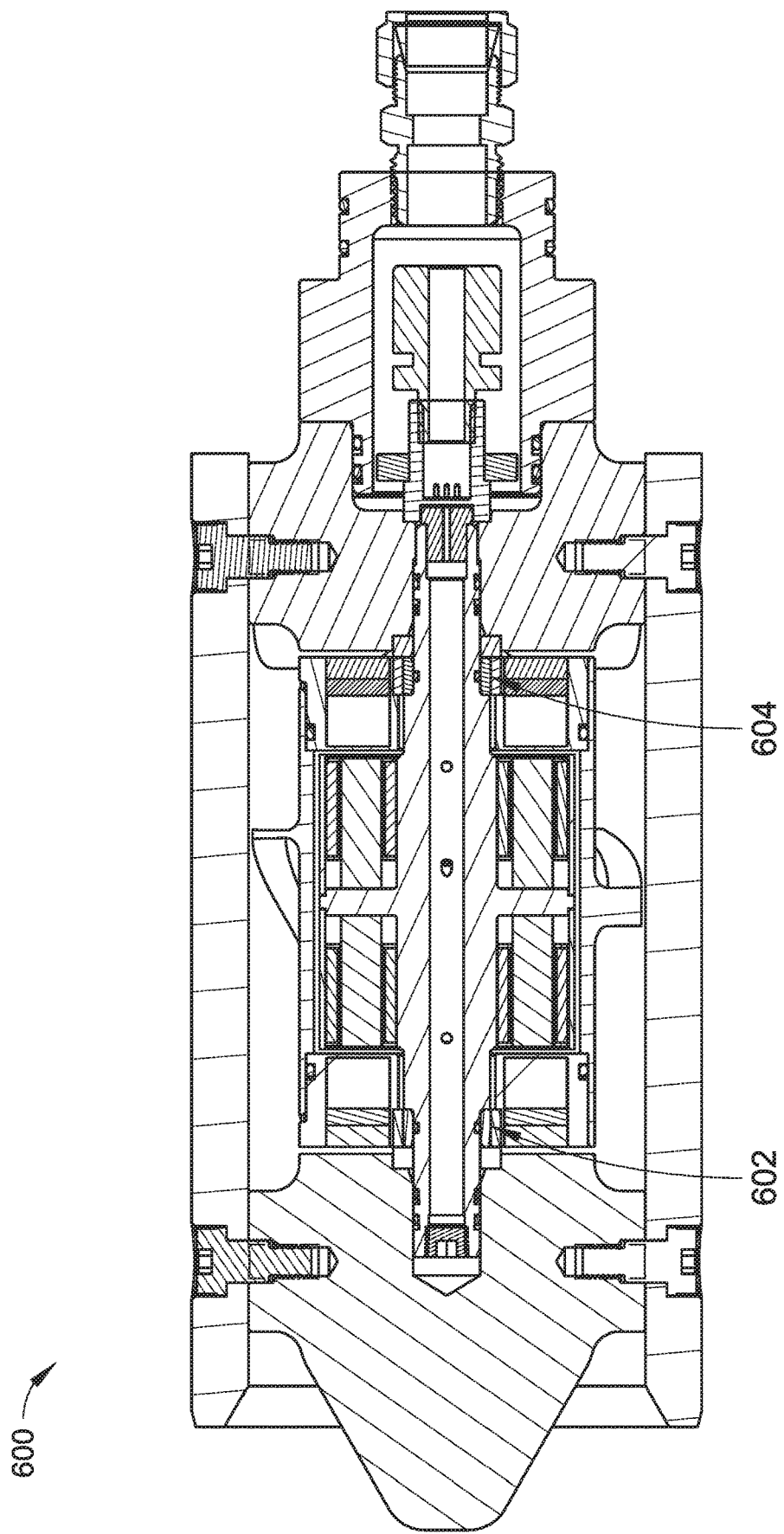
FIG. 6 illustrates an example apparatus implementing an axial flux generator in accordance with one or more embodiments.

With reference to FIG. 6, an axial flux generator 600 is described. The generator 600 can have diamond or hard journal bearings 602 and/or 604 on either or both sides of the generator 600. In some embodiments, inner bearings and/or thrust bearings can be formed using bonding to a shell/liner for press fit installation (e.g., as described with reference to FIGS. 17 through 22. Inner bearings can also be formed using direct bonding with a taper (e.g., as described with reference to FIGS. 23 through 27). Further, outer bearings can be formed using direct bonding with a fixture (e.g., as described with reference to FIGS. 33 through 35). In this configuration, both sides of the bearings 602 and 604 may be possible inlets for particles, and the bearings 602 and 604 can limit the size of the particles, allowing the magnets to be much closer to the laminations and increasing the power output of the generator 600.

Figure 7:
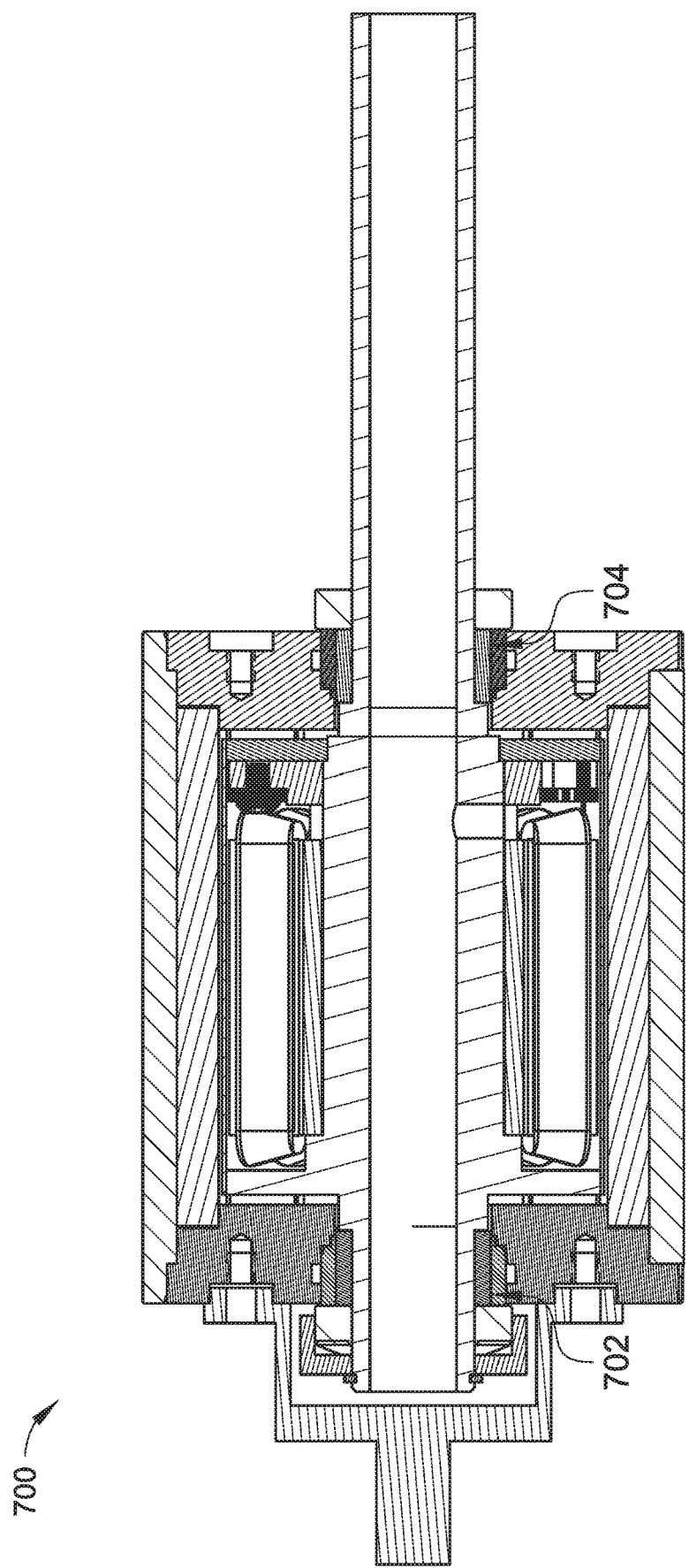
FIG. 7 illustrates an example apparatus implementing a radial flux generator/motor in accordance with one or more embodiments.

With reference to FIG. 7, a radial flux generator and/or motor 700 is described. The generator/motor 700 can have diamond or hard journal bearings 702 and/or 704 on either or both sides of the generator 700. In some embodiments, inner bearings, outer bearings, and/or thrust bearings can be formed using bonding to a shell/liner for press fit installation (e.g., as described with reference to FIGS. 17 through 22). In some embodiments, rather than using a press fit configuration, a threaded metal shell may be used for thrust bearings at an output end of the motor (e.g., proximate to bearing 702). In this configuration, both sides of the bearings 702 and 704 can be possible inlets for particles, and the bearings 702 and 704 can limit the size of the particles, allowing the magnets can be much closer to the laminations and increasing the power output of the generator.

Figure 8:
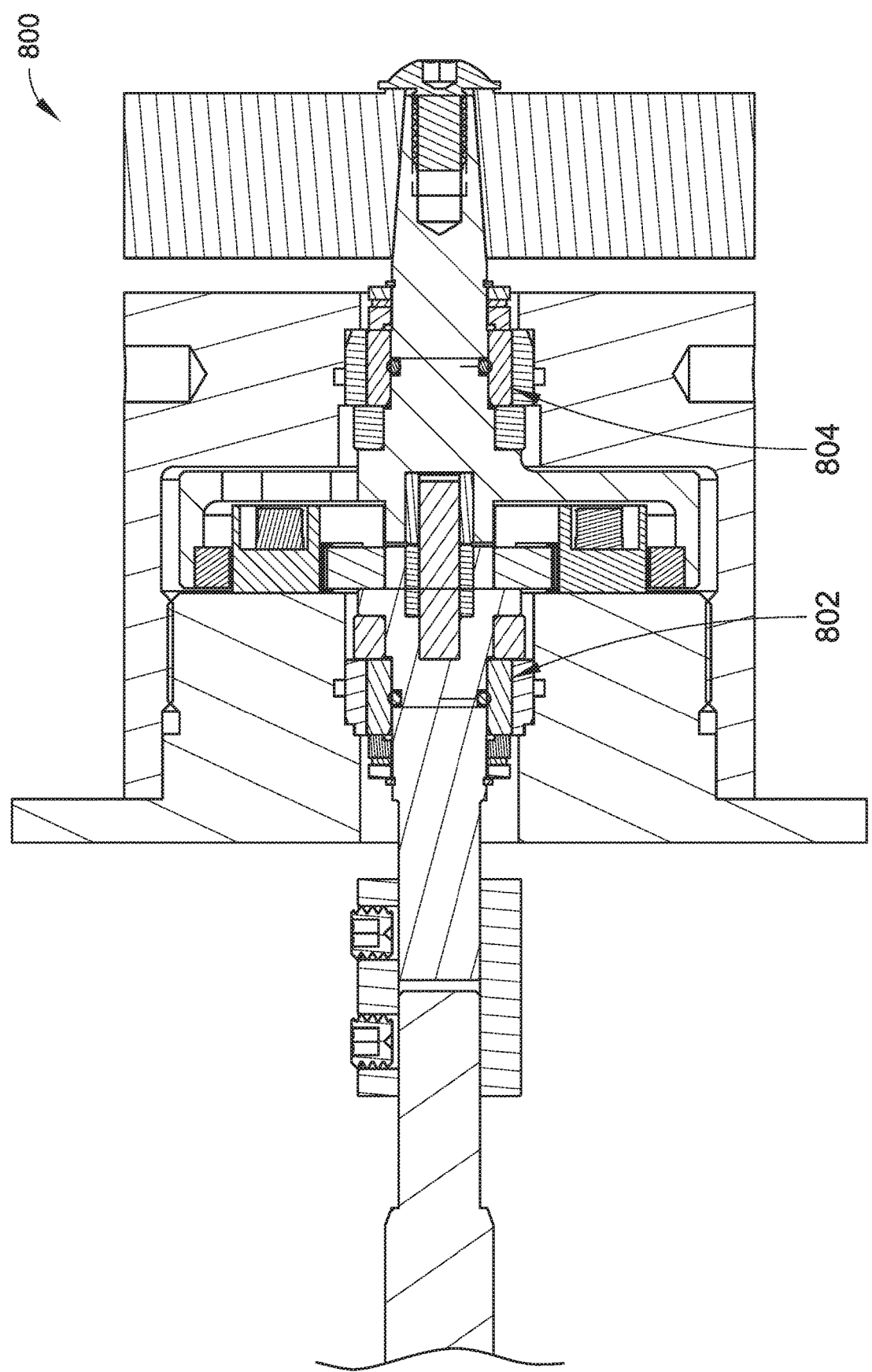
FIG. 8 illustrates an example apparatus implementing a gearbox in accordance with one or more embodiments.

With reference to FIG. 8, a gearbox 800 is described. The gearbox 800 can have diamond or hard journal bearings 802 and/or 804 on either or both sides of the gears. In some embodiments, bearings 802 and/or 804 can be formed using bonding to a shell/liner for press fit installation (e.g., as described with reference to FIGS. 17 through 22), direct bonding with a press fit, and/or direct bonding with a taper (e.g., as described with reference to FIGS. 23 through 27). In this configuration, both sides of the gears can be possible inlets for particles, and the bearings 802 and 804 can limit the size of the particles to prevent or reduce large particles that may otherwise be caught between gears, possibly wearing the gears more quickly. In some implementations, a two-to-one (2:1) gear reduction can be used to reverse a direction of motion (e.g., while maintaining an in-line axis). For example, the position of the planet gears can be fixed with respect to the housing, allowing the sun and ring gears to rotate.

In some embodiments, one or more of the gears in the gearbox 800 can be constructed from diamond and/or one or more other hard materials (e.g., carbide) to withstand particle impacts from materials entering the gearbox 800 (e.g., drilling mud). Further, in some embodiments, one or more additional particle-based materials can be added to the gearbox 800 (e.g., in the manner of a thickener used with a lubricant pack for the gearbox 800). For example, the gearbox 800 can be pre-packed prior to deployment with a mix of lubricating particles (e.g., polytetrafluoroethylene (PTFE) power and/or beads) and a suitable carrier fluid, such as gear oil, grease, water, alcohol, gel, non-abrasive drilling mud, and so on. However, PTFE is provided by way of example and is not meant to limit the present disclosure. In other embodiments, polyether ether ketone (PEEK) powder and/or beads can be used. In this configuration, a mud stream entering the gear box can then be mixed into the existing lubricant pack. As described herein, diameters of these lubricating particles can be larger than the largest diameter of drilling mud particles as filtered by the diamond or hard bearings described herein. In this manner, the gears may impact these particles rather than the largest particles of drilling mud.

Figure 9:
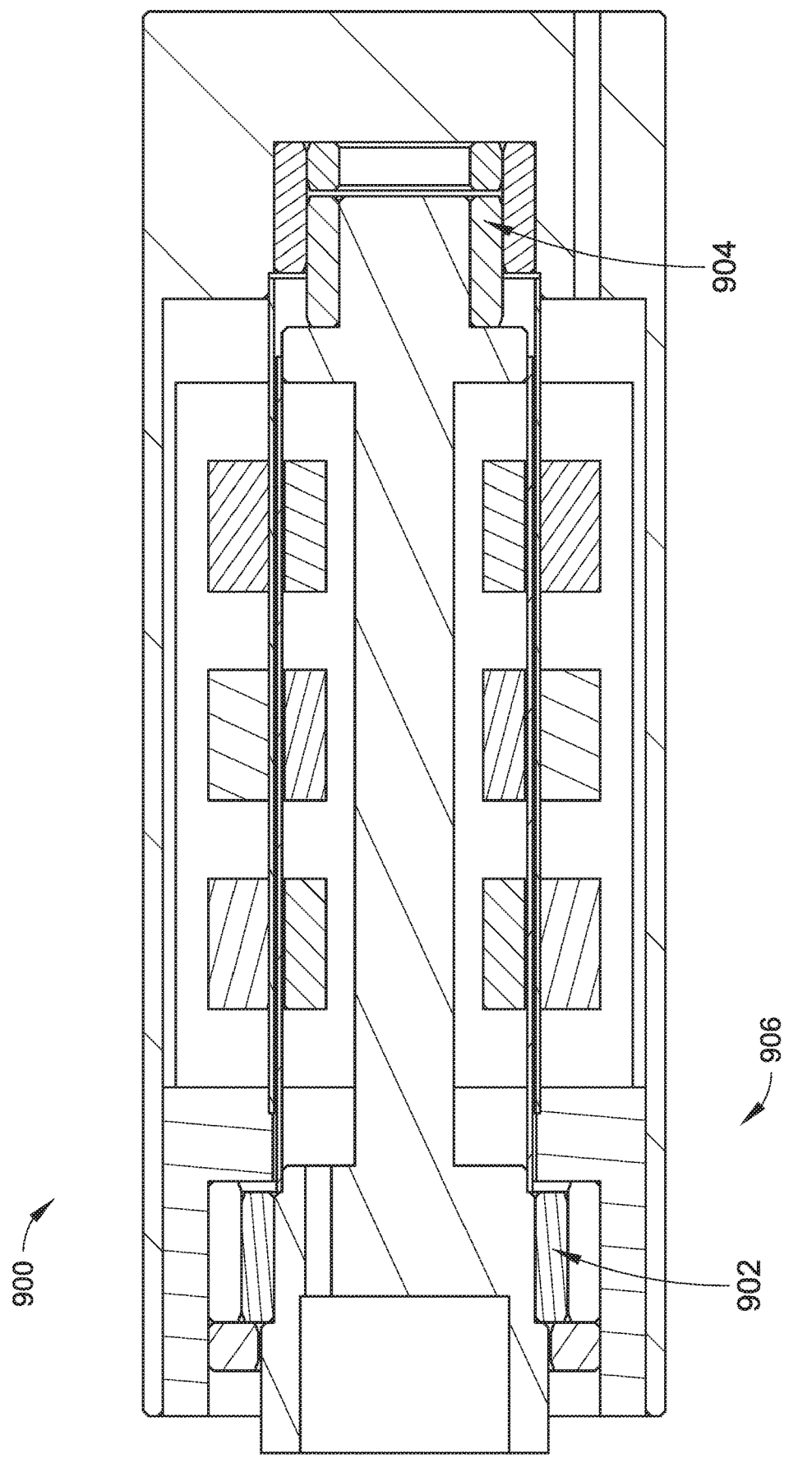
FIG. 9 illustrates an example apparatus implementing a rotary data swivel in accordance with one or more embodiments.

With reference to FIG. 9, a rotary data swivel 900 is described. The data swivel 900 can have diamond or hard journal bearings 902 and/or 904 on either or both sides of the coils. In some embodiments, an inner bearing and/or an outer bearing for bearing 902 can be formed using direct bonding with a fixture (e.g., as shown in FIGS. 33 through 35). Further, a thrust bearing can be formed using, for example, PEEK bonded to a threaded metal ring. In some embodiments, an inner bearing for bearing 904 can be formed using bonding to a shell/liner for press fit installation (e.g., as described with reference to FIGS. 17 through 22), direct bonding with a taper (e.g., as described with reference to FIGS. 23 through 27), and/or direct bonding with a fixture (e.g., as described with reference to FIGS. 33 through 35). Further, a thrust bearing can be formed using bonding to a metal stud (e.g., rather than a shell) and press fit or threaded. In some embodiments, an outer bearing can be formed using direct bonding with a fixture (e.g., as shown in FIGS. 33 through 35), and may be fused with a material having a lower curing temperature than, for instance, PEEK. As shown in the accompanying figures, side 906 of the coils can be a possible inlet for particles, and the bearings 902 and 904 can limit the size of the particles, allowing the two magnetic concentrators around the wire coils to be much closer to one another and increasing the signal input of the receiving coils. In some embodiments, thin metal protective tubes on the inner and/or outer portions of the swivel can be removed (e.g., to decrease the gap further).

It should be noted that while the present disclosure has described devices that use bearings formed of diamond material and/or one or more other hard materials with some specificity, other devices can also use such bearings, including, but not necessarily limited to: sensors and transducers that use a clean environment to operate and/or rotate or move linearly, electronics that are otherwise potted (e.g., the coils in a generator and/or motor, integrated circuit chips, and so on), components that are isolated from mud and large particles but can otherwise survive high pressure (e.g., without a pressure housing), and so forth.

Figure 10:
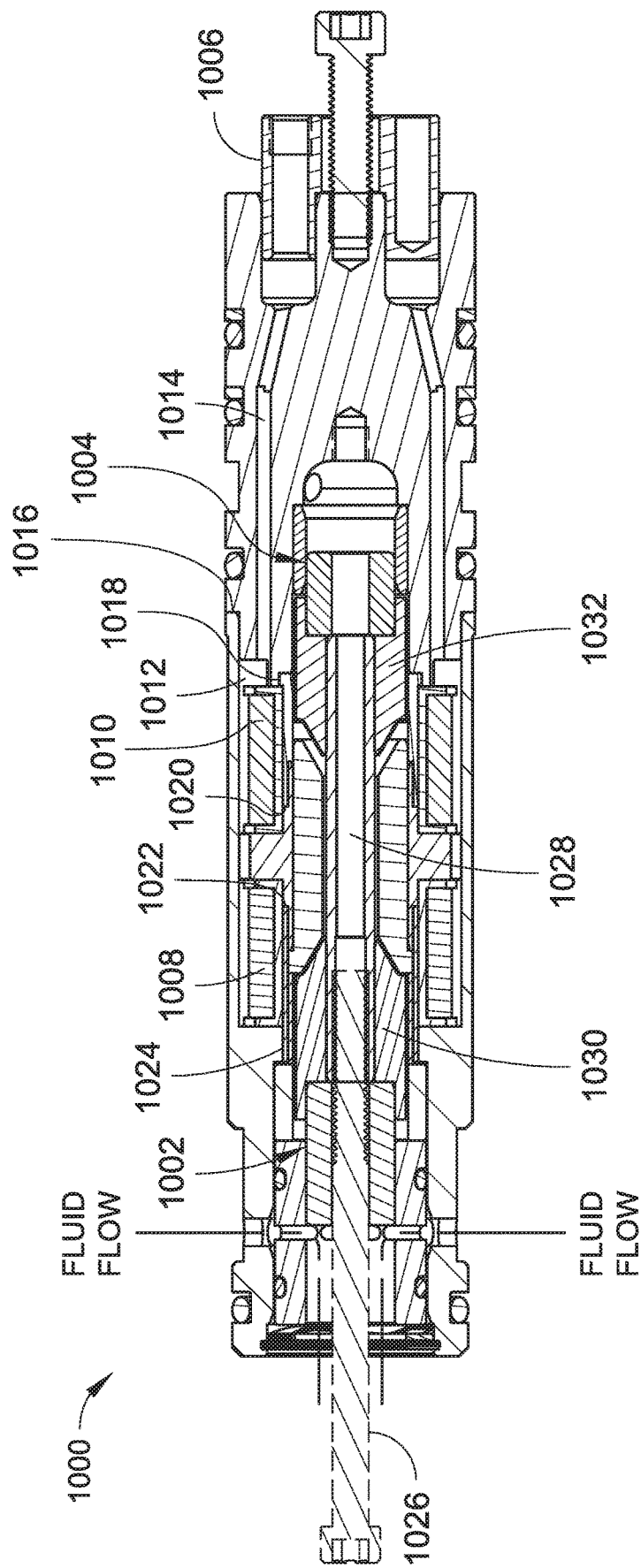
FIG. 10 illustrates an example apparatus implementing a digital actuator in accordance with one or more embodiments.

Referring now to FIGS. 10 through 16, devices are described that use one or more bearings formed of diamond material and/or one or more other hard materials (e.g., carbide, ceramic, and so on) to implement filter systems. With reference to FIG. 10, a digital actuator 1000 is described. The digital actuator 1000 uses a diamond or other hard material valve and bearing 1002 to filter particles that enter through a tight gap between diamond or other hard material parts. In some embodiments, the bearing 1002 can be formed using a direct bonding with a fixture (e.g., as described with reference to FIGS. 33 through 35). In some embodiments, the size of particles that enter the gap can be limited to less than between about 50.8 µm (two one-thousandths of an inch (0.002 in.)) and 76.2 µm (three one-thousandths of an inch (0.003 in.)). However, these particle sizes are provided by way of example and are not meant to limit the present disclosure. In other embodiments, the bearing can be used to allow particles having sizes less than about 50.8 µm (two one-thousandths of an inch (0.002 in.), greater than about 76.2 µm (three one-thousandths of an inch (0.003 in.)), and so forth. The digital actuator 1000 can also include a diamond or other hard material bearing 1004, a connector block 1006 (e.g., formed of PEEK and/or another polymer material), solenoid windings 1008 and 1010, potting 1012, one or more cavities for wire routing 1014, and so forth.

In some embodiments, the digital actuator 1000 can employ a welded stator. For example, E-beam weld joints 1016, 1018, 1020, 1022, and/or 1024 can be used to isolate the windings from the mud, and potting 1012 can be used to allow thin walls to withstand the pressure. In some embodiments, the bearings 1002 and/or 1004 can be press-fit into the device. In such implementations, an outer bearing may be machined out (e.g., to salvage internal mechanisms). In embodiments of the disclosure, the digital actuator 1000 may include removable and/or serviceable parts (e.g., employing a snap ring with inner parts that can be removed with a bolt 1026 that can be threaded into an inner tube 1028). The inner tube 1028 and the bearings 1002 and/or 1004 can be press-fit into receivers 1030 and/or 1032.

Figure 11:
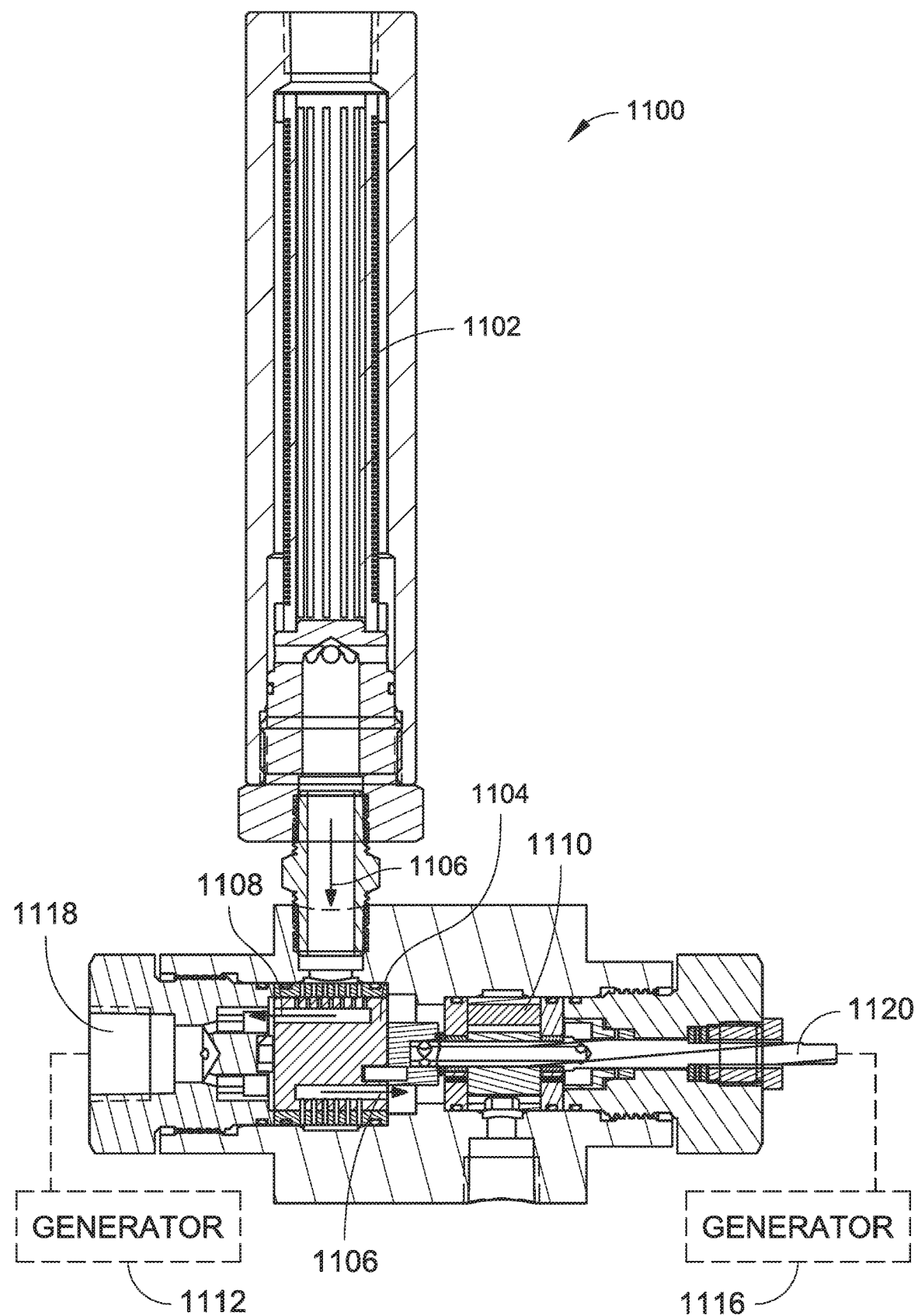
FIG. 11 illustrates an example apparatus implementing an inner rotating filter in accordance with one or more embodiments.
Figure 12:
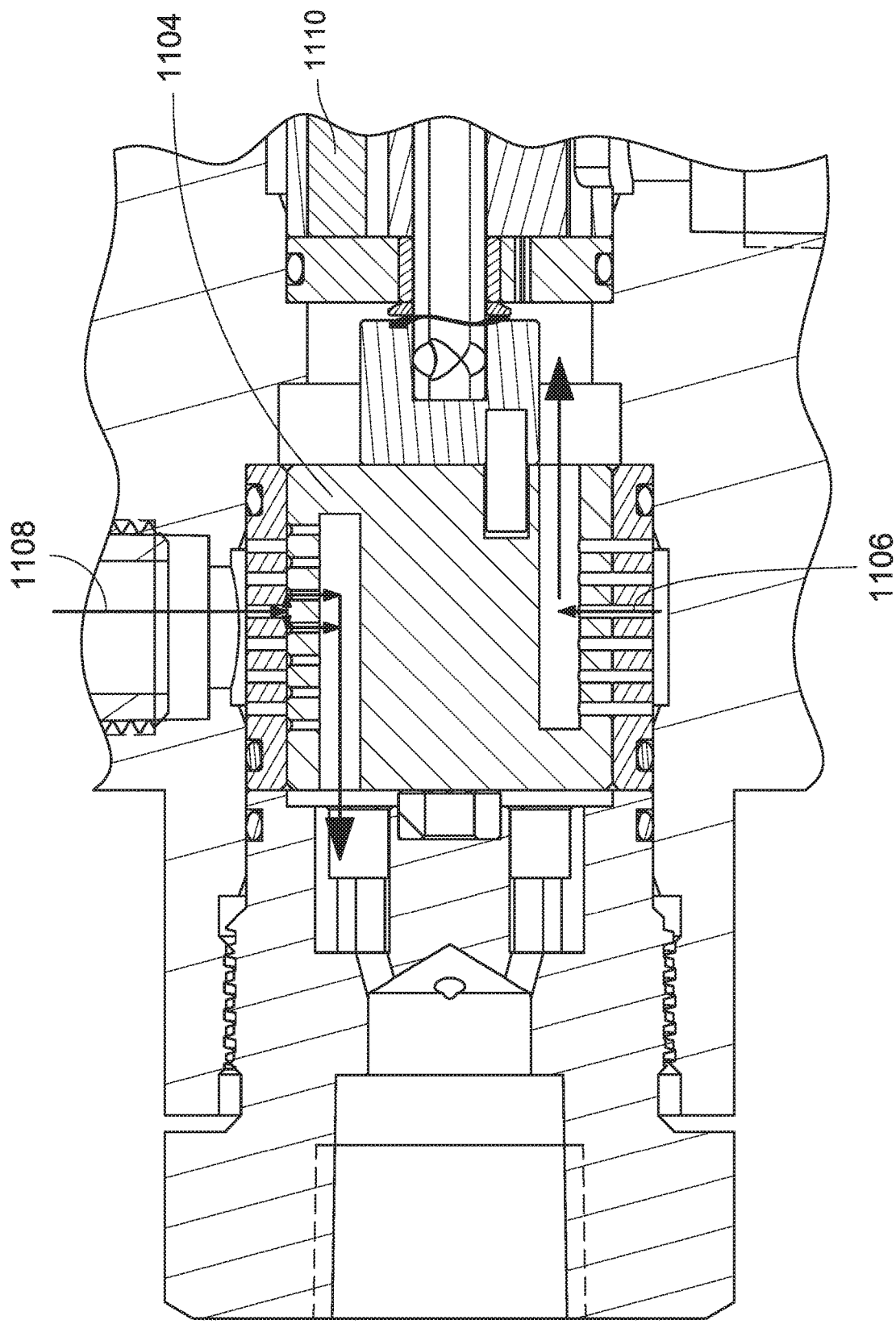
FIG. 12 is another illustration of the example apparatus of FIG. 11.
Figure 13:
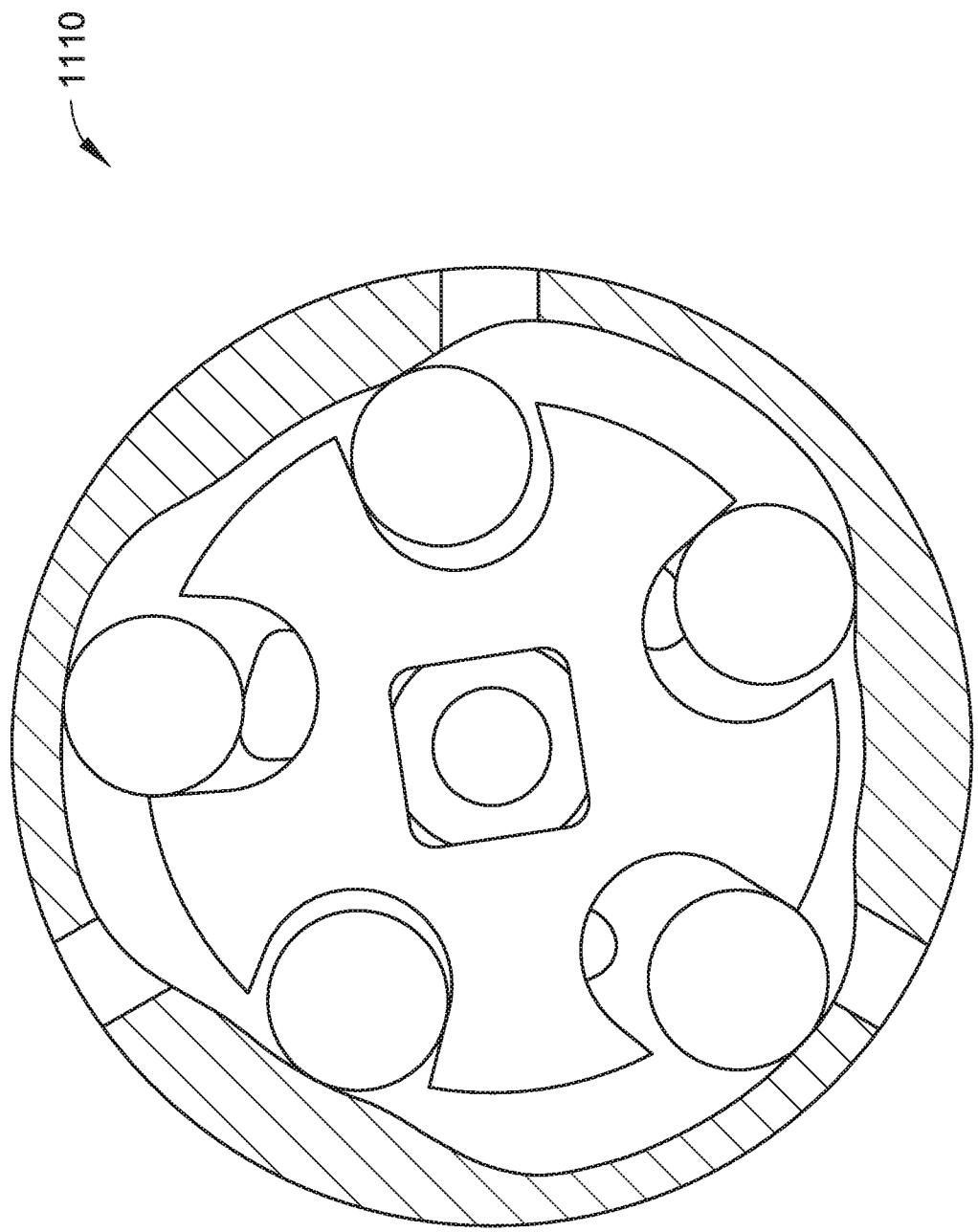
FIG. 13 illustrates an example apparatus implementing a roller vane motor in accordance with one or more embodiments.

Referring now to FIGS. 11 through 13, an inner rotating filter implemented using a filter assembly 1100 is described. The filter assembly 1100 includes a screen (e.g., a wedge wire screen 1102) in fluid communication with a diamond or other hard material filter 1104. The screen 1102 can perform initial filtering of drilling mud (e.g., to a fluid flow 1106 having a maximum particle size of about 508 µm (two one-hundredths of an inch (0.02 in.))). Then, the filter 1104 can be used to further filter the drilling mud (e.g., to a fluid flow 1108 having a maximum particle size of about 50.8 µm (two one-thousandths of an inch (0.002 in.))). In embodiments of the disclosure, larger particles are not ground up, instead passing through the mechanism (e.g., bypassing to a roller vane motor 1110). This configuration can allow a standard wedge wire screen to be used for initial filtering. For example, with reference to FIG. 12, the fluid flow 1106 from the screen 1102 can pass through apertures which are aligned between an inner rotating member of the filter 1104 connected to the roller vane motor 1110 and an outer member of the filter 1104, while the fluid flow 1108 can be further filtered by directing the flow between adjacent surfaces of the inner rotating member of the filter 1104 and the outer member of the filter 1104, which can be very closely spaced (e.g., as previously described). In some embodiments, an inner portion of the filter can be formed using a process where one or both parts are oversized, and final machining is performed after bonding. Further, an outer portion of the filter can be formed using a metal-shell press fit. In other embodiments, O-rings may be used to contain the pressure. In some embodiments, a jam nut can be used to hold the filter in place, possibly with a compliant member (e.g., an O-ring, a coned-disc spring, a heavy wave spring) to account for thermal expansion differences. The roller vane motor 1110 can be formed using direct bonding with a fixture (e.g., as described with reference to FIGS. 33 through 35). In some embodiments, the filter can be a magnet filter.

It should be noted that in some embodiments, the diamond or other hard material bushings used in this configuration do not necessarily lock up under pressure. Further, the diamond or other hard material roller vane motor 1110 can facilitate an increased motor length (e.g., for additional power output). With reference to FIG. 13, the large gap between the rotor and the stator of the roller vane motor 1110 can allow larger particles (e.g., having a maximum particle size of about 508 µm (two one-hundredths of an inch (0.02 in.))) to pass through the roller vane motor 1110. Further, referring again to FIG. 11, in some embodiments, the roller vane motor 1110 can be connected to additional devices, such as a generator 1112 and/or a generator 1116 (e.g., via an output shaft 1120, an output shaft 1118, and so on). It should also be noted that while fluid flow filtered to an initial maximum particle size of about 508 µm (two one-hundredths of an inch (0.02 in.)) and further filtered to a maximum particle size of about 50.8 µm (two one-thousandths of an inch (0.002 in.)) has been described with some specificity, these particle sizes are provided by way of example and are not meant to limit the present disclosure. Thus, in other embodiments, filtering can be provided to facilitate different maximum particle sizes.

Figure 14:
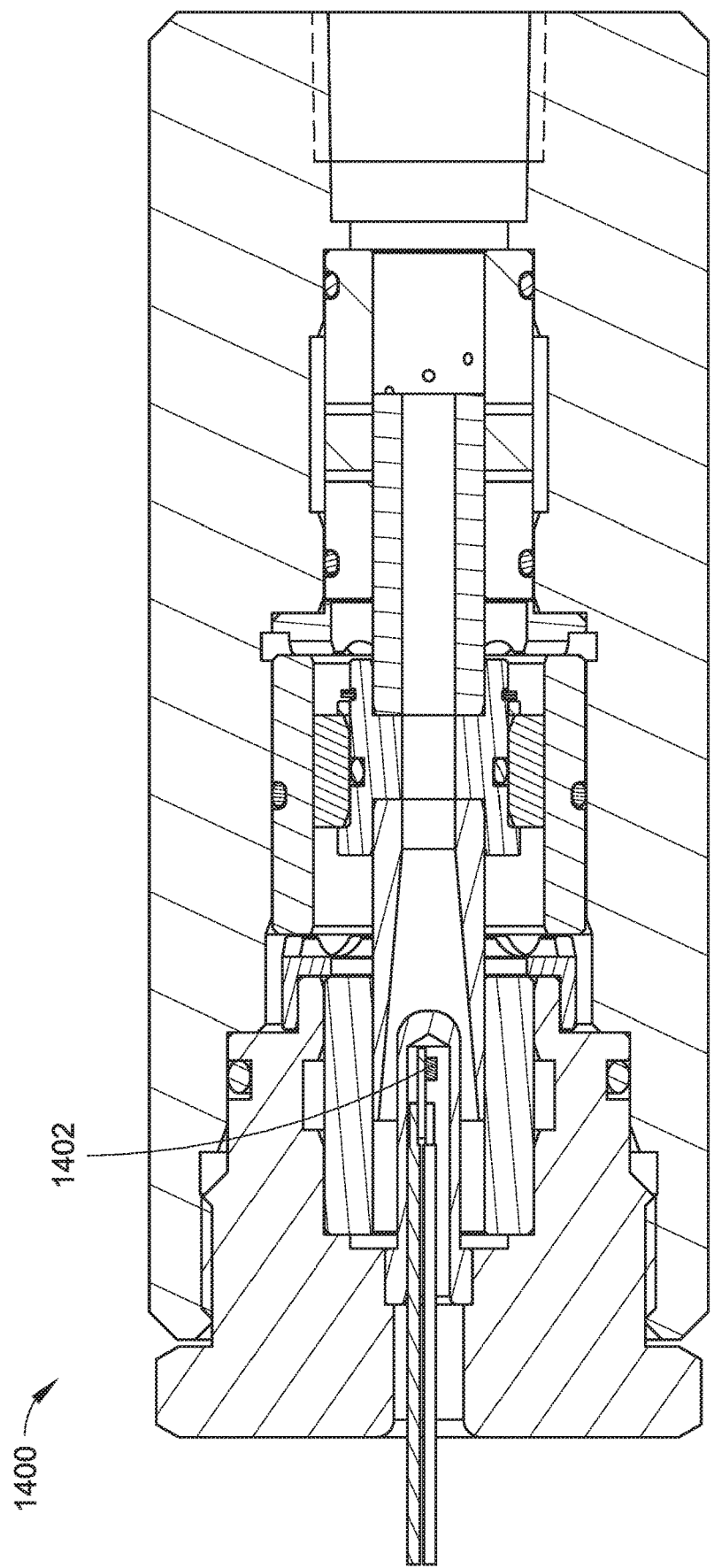
FIG. 14 illustrates an example apparatus implementing a proportional valve with a position sensor in accordance with one or more embodiments.
Figure 15:
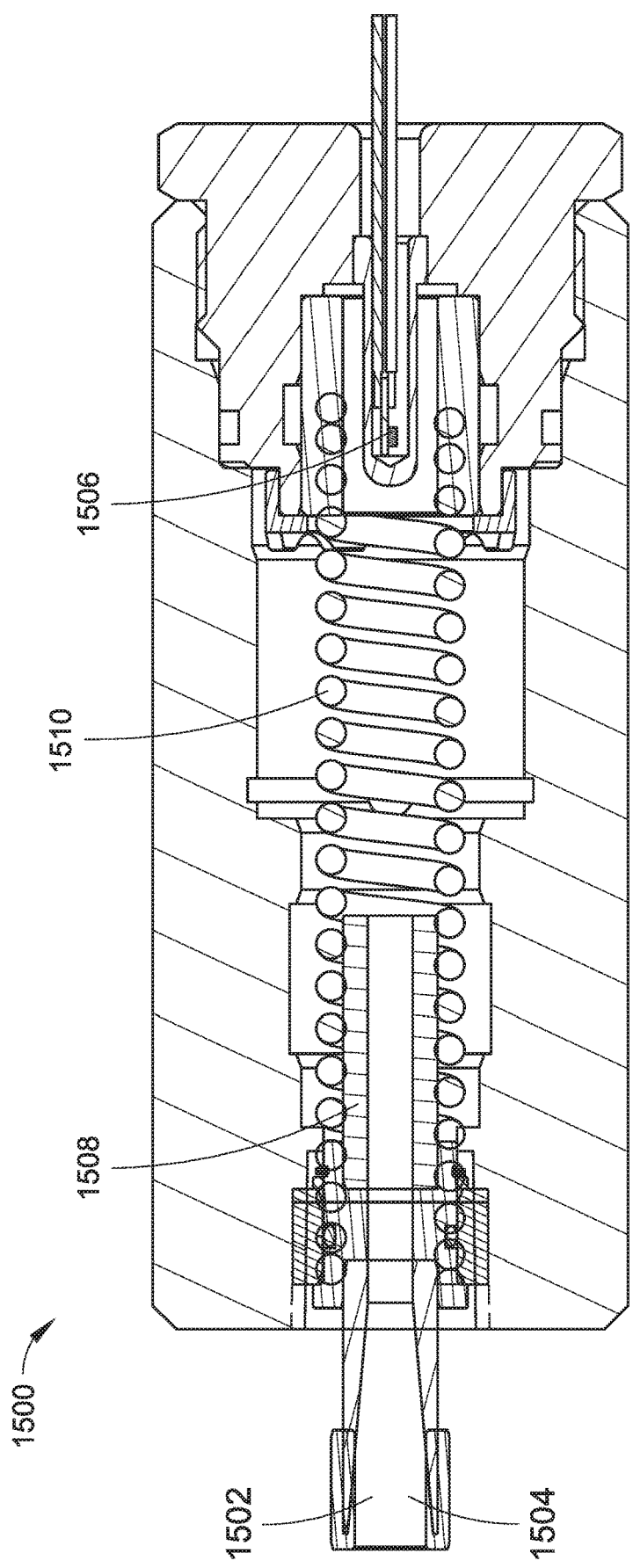
FIG. 15 illustrates an example apparatus implementing a pressure differential sensor in accordance with one or more embodiments.

With reference to FIG. 14, a proportional valve 1400 with a position sensor 1402 is described. In some embodiments, the proportional valve 1400 employs one or more diamond or other hard bearings. In other embodiments, the proportional valve does not employ such bearings. When connected to one or more diamond or other hard material filters (e.g., as previously described with reference to FIGS. 10 through 13), the proportional valve 1400 can facilitate tightly controlled proportional fluid flow, since the exhaust nozzles can be smaller than they would otherwise be with a flow that was not filtered (e.g., due to clogging from large sized particles). In some embodiments, the position of the proportional valve 1400 can be adjusted by opening actuator valves to supply fluid into one or the other side of the valve cavities. When the proportional valve is fully closed, an exhaust can be opened, and the piston can drain through the exhaust. With reference to FIG. 15, a pressure differential sensor 1500 employing a diamond or other hard material piston 1502 is described. The pressure differential sensor 1500 can include a high pressure inlet 1504, a position sensor 1506, a magnetic core 1508, and a biasing device (e.g., a pressure spring 1510).

Figure 16:
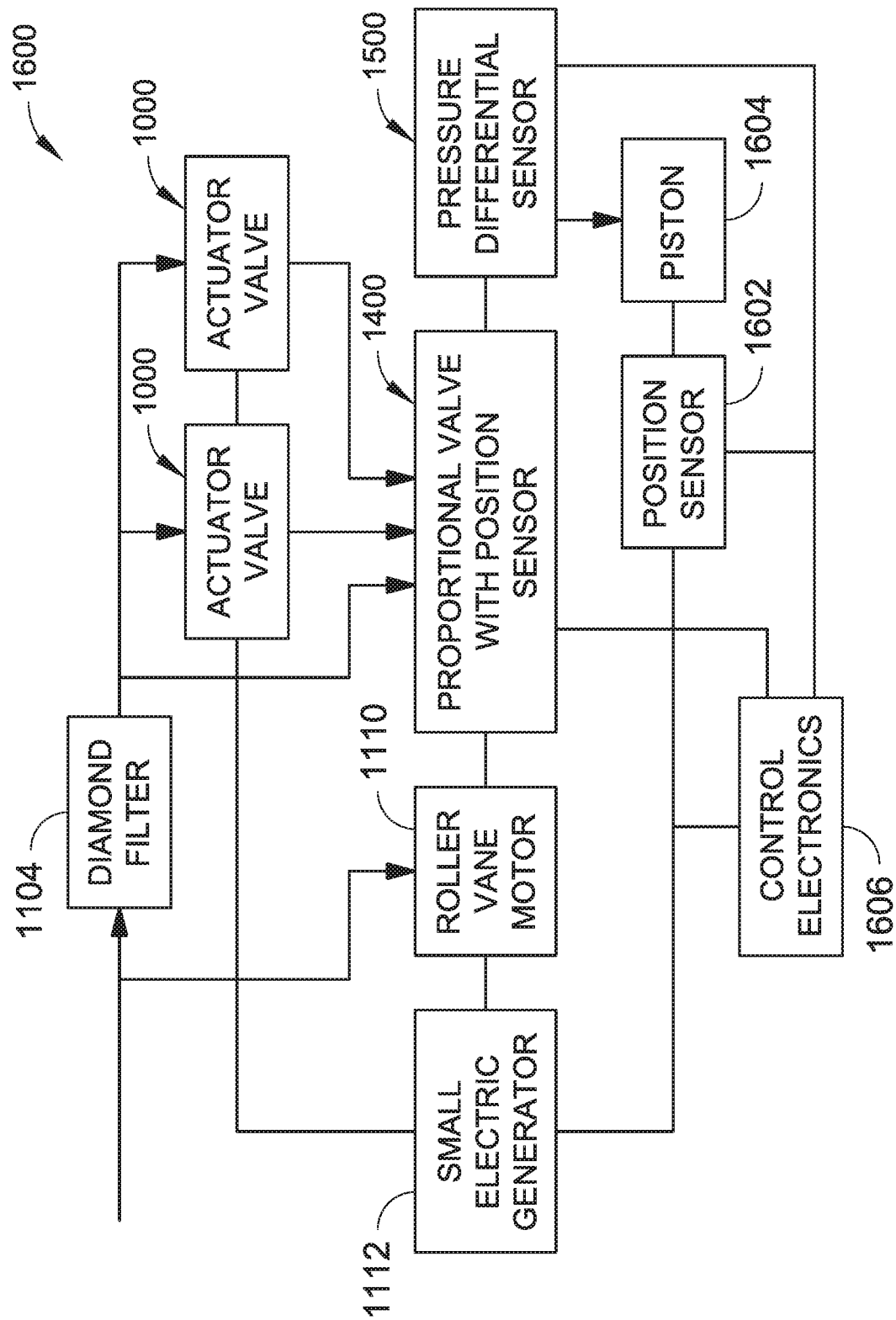
FIG. 16 illustrates an example system in which embodiments of hard bearing attachment and alignment systems, apparatus, and techniques can be implemented.

Referring now to FIG. 16, a filtration system 1600 is described. The filtration system 1600 can include digital actuators 1000 described with reference to FIG. 10, the filter 1104 described with reference to FIGS. 11 and 12, the roller vane motor 1110 described with reference to FIGS. 11 and 13, the proportional valve 1400 (e.g., with position sensor 1402) described with reference to FIG. 14, and/or the pressure differential sensor 1500 described with reference to FIG. 15. The system can also include one or more electric generators (e.g., generator 1112 of FIG. 11), a position sensor 1602, a piston 1604, control electronics 1606, and so forth.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Additionally, it should be understood that references to "one embodiment" or "an embodiment" of the present disclosure are not intended to be interpreted as excluding the existence of additional embodiments that also incorporate the recited features. For example, features shown in individual embodiments referred to above may be used together in combinations other than those which have been shown and described specifically. Accordingly, any such modification is intended to be included within the scope of this disclosure. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means-plus-function for any limitations of any of the claims herein, except for those in which the claim expressly uses the words 'means for' together with an associated function.

What is claimed is:

1. A mechanical bearing comprising:
   a hard bearing element, the hard bearing element having a first coefficient of thermal expansion;
   a support element affixed to the hard bearing element, at least one of the hard bearing element or the support element including a textured bonding surface, the support element having a second coefficient of thermal expansion different from the first coefficient of thermal expansion; and
   a joining element between the hard bearing element and the support element and fixing the hard bearing element to the support element, the joining element being more flexible than the hard bearing element and the support element, wherein the textured bonding surface takes up shrinkage in the joining element due to a thermal expansion mismatch between the hard bearing element and the support element.

2. The mechanical bearing as recited in claim 1, wherein the mechanical bearing comprises a journal bearing.

3. The mechanical bearing as recited in claim 1, wherein the hard bearing element comprises an ultrahard material.

4. The mechanical bearing as recited in claim 3, wherein the ultrahard material comprises at least one of a diamond-based material or a tungsten carbide material.

5. The mechanical bearing as recited in claim 1, wherein the support element comprises at least one of a metal or a metal alloy.

6. The mechanical bearing as recited in claim 1, wherein the support element comprises a mechanical assembly feature.

7. The mechanical bearing as recited in claim 1, wherein the joining element is melted between the hard bearing element and the support element.

8. The mechanical bearing as recited in claim 1, wherein the joining element comprises at least one of a polymer, an epoxy, an anaerobic adhesive, an elastomer, or a threading compound.

9. The mechanical bearing as recited in claim 1, wherein the support element comprises at least one of a shaft or a housing.

10. The mechanical bearing as recited in claim 1, wherein the joining element is disposed in mating tapers formed in the hard bearing element and the support element.

11. The mechanical bearing of claim 1, the support element including a support mechanical feature and the hard bearing element including a bearing mechanical feature, the support mechanical feature and the bearing mechanical feature supporting at least a portion of the bearing load on the mechanical bearing.

12. A method of forming a mechanical bearing having a mounting surface and a running surface, the method comprising:
    fixing a joining element between a hard bearing element having a first surface and a support element to join the hard bearing element and the support element, the joining element being more flexible than the hard bearing element and the support element; and
    modifying a surface of the support element to provide a second surface on the support element aligned with the first surface on the hard bearing element.

13. The method as recited in claim 12, wherein the mechanical bearing comprises at least one of a thrust bearing or a journal bearing.

14. The method as recited in claim 12, wherein the hard bearing element comprises an ultrahard material.

15. The method as recited in claim 14, wherein the ultrahard material comprises at least one of a diamond-based material or a tungsten carbide material.

16. The method as recited in claim 12, wherein the support element comprises at least one of a metal or a metal alloy.

17. The method as recited in claim 12, wherein the joining element is melted between the hard bearing element and the support element.

18. The method as recited in claim 12, wherein the joining element comprises at least one of a polymer, an epoxy, an anaerobic adhesive, an elastomer, or a threading compound.

19. The method as recited in claim 12, wherein the support element comprises at least one of a shaft or a housing.

20. The method as recited in claim 12, wherein the joining element is disposed in mating tapers formed in the hard bearing element and the support element.

21. A method of forming a mechanical bearing having a mounting surface and a running surface, the method comprising:
    positioning the hard bearing element with a first surface and the support element with a second surface to align the first surface on the hard bearing element with the second surface using an alignment fixture; and joining the hard bearing element and the support element using a joining element on the bonding surface, the joining element being more flexible than the hard bearing element and the support element;
dialing in to the bearing surface; and
machining the support element to an operating shape and dimension.

\* \* \* \* \*